US011922875B2

(12) United States Patent
Tanaka

(10) Patent No.: US 11,922,875 B2
(45) Date of Patent: Mar. 5, 2024

(54) PIXEL CIRCUIT, DISPLAY DEVICE, AND DRIVE METHOD THEREFOR

(71) Applicant: Sharp Kabushiki Kaisha, Sakai (JP)

(72) Inventor: Kohhei Tanaka, Sakai (JP)

(73) Assignee: SHAR KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/791,588

(22) PCT Filed: Jan. 31, 2020

(86) PCT No.: PCT/JP2020/003682
§ 371 (c)(1),
(2) Date: Jul. 8, 2022

(87) PCT Pub. No.: WO2021/152823
PCT Pub. Date: Aug. 5, 2021

(65) Prior Publication Data
US 2023/0034225 A1 Feb. 2, 2023

(51) Int. Cl.
*G09G 3/3233* (2016.01)
*G09G 3/3266* (2016.01)
*G09G 3/3291* (2016.01)

(52) U.S. Cl.
CPC ......... *G09G 3/3233* (2013.01); *G09G 3/3266* (2013.01); *G09G 3/3291* (2013.01);
(Continued)

(58) Field of Classification Search
CPC .. G09G 3/3233; G09G 3/3266; G09G 3/3291; G09G 2300/0842; G09G 2320/0247; G09G 2330/021
See application file for complete search history.

(56) References Cited

U.S. PATENT DOCUMENTS

2004/0036669 A1 2/2004 Yanagi et al.
2012/0050252 A1* 3/2012 Akimoto .............. G09G 3/3233 345/212
(Continued)

FOREIGN PATENT DOCUMENTS

JP 2004-078124 A 3/2004
JP 2006-084758 A 3/2006
(Continued)

OTHER PUBLICATIONS

Official Communication issued in International Patent Application No. PCT/JP2020/003682, dated Mar. 24, 2020.

*Primary Examiner* — Kenneth B Lee, Jr.
(74) *Attorney, Agent, or Firm* — Keating & Bennett, LLP

(57) ABSTRACT

The present application discloses a display device capable of performing favorable display in which flicker is not visually recognized while the power consumption of a scanning-side drive circuit, as well as a data-side drive circuit, can be reduced sufficiently when pause driving is performed. A pixel circuit including emission control transistors M5, M6 in addition to a drive transistor M1 includes a switching element that is turned on based on a voltage of an emission control line Ei to initialize an organic EL element OL when the voltage of the emission control line Ei is at a level for turning off the emission control transistors M5, M6. For example, in some embodiments, the anode electrode of the organic EL element OL is connected to an initialization voltage line Vini via an N-channel transistor M7 serving as the switching element, and the emission control line Ei is connected to the gate terminal of the transistor M7. In the pixel circuit, the transistors M1, M5, M6, and the like except for the transistor M7 are all P-channel transistors.

16 Claims, 21 Drawing Sheets

(52) U.S. Cl.
CPC ............... *G09G 2300/0842* (2013.01); *G09G 2320/0247* (2013.01); *G09G 2330/021* (2013.01)

(56) References Cited

U.S. PATENT DOCUMENTS

| | | | |
|---|---|---|---|
| 2018/0374415 A1 | 12/2018 | Morita et al. | |
| 2019/0057646 A1 | 2/2019 | Lin et al. | |
| 2019/0228706 A1* | 7/2019 | Umeda | G09G 3/3258 |

FOREIGN PATENT DOCUMENTS

| | | |
|---|---|---|
| JP | 2012-047894 A | 3/2012 |
| JP | 2018-013567 A | 1/2018 |
| JP | 2019-128447 A | 8/2019 |

* cited by examiner

PIXEL CIRCUIT, DISPLAY DEVICE, AND DRIVE METHOD THEREFOR

TECHNICAL FIELD

The disclosure relates to a display device, and more particularly to a pixel circuit in a current-driven display device including a display element driven by a current such as an organic electroluminescence (EL) element, the display device, and a drive method therefor.

BACKGROUND ART

In recent years, an organic EL display device provided with a pixel circuit including an organic EL element (also referred to as an organic light-emitting diode (OLED)) has been put into practical use. The pixel circuit of the organic EL display device includes, in addition to the organic EL element, a drive transistor, a write control transistor, a holding capacitor, and the like. A thin-film transistor is used for the drive transistor and the write control transistor, the holding capacitor is connected to a gate terminal serving as the control terminal of the drive transistor, and a voltage corresponding to a video signal representing an image to be displayed (more specifically, a voltage indicating a gradation value of a pixel to be formed in the pixel circuit) is supplied as a data voltage to the holding capacitor from a drive circuit via a data signal line. The organic EL element is a self-emitting display element that emits light with a luminance corresponding to a current flowing therethrough. The drive transistor is provided in series with the organic EL element and controls the current flowing through the organic EL element in accordance with the voltage held in the holding capacitor.

Meanwhile, as a display device having a low power consumption, a display device that performs pause driving (also referred to as intermittent driving or low-frequency driving) is known. The pause driving is a drive method in which a drive period (refresh period) and a pause period (non-refresh period) are provided when the same image is continuously displayed, the drive circuit is operated during the drive period, and the operation of the drive circuit is stopped during the pause period. The pause driving can be applied to a case where the off-leak characteristic of the transistor in the pixel circuit is favorable (the off-leak current is small). The display device that performs pause driving is described in, for example, Patent Document 1.

CITATION LIST

Patent Documents

Patent Document 1: JP 2004-78124 A
Patent Document 2: US 2019/0057646 A1

SUMMARY

Technical Problem

The pixel circuit in the organic EL display device usually includes an emission control transistor for turning off the organic EL element during a period in which a data voltage is written to the pixel circuit. In each pixel circuit, in a non-emission period in which the organic EL element has been brought into a lights-off state by the emission control transistor, in addition to the writing of the data voltage, the initialization of the organic EL element is performed by discharging an accumulated charge in the parasitic capacitance of the organic EL element (hereinafter, this initialization is referred to as "OLED initialization"). Note that the OLED initialization is also referred to as "anode initialization" or "anode reset" because the voltage of the anode electrode of the organic EL element (hereinafter referred to as "anode voltage") is initialized.

When pause driving is performed in the organic EL display device, in the drive period, the organic EL element in each pixel circuit is brought into the lights-off state by the emission control transistor in the non-emission period provided for each frame period, and OLED initialization is performed. However, during the pause period, since the operation of the drive circuit is stopped, light emission is continued at a luminance corresponding to the data voltage written in the previous drive period. In general, the pause period is significantly longer than the drive period (e.g., the drive period is made up of one or several frame periods, and the pause period is made up of several tens of frame periods), and such a drive period and a pause period appear alternately during operation in the organic EL display device of the pause driving system. Therefore, when such pause driving is performed, the lights-off of the organic EL element in the drive period is visually recognized as flicker.

In contrast, Patent Document 2 describes a pixel circuit and a drive method therefor, the pixel circuit being configured to cause a decrease in luminance at an appropriate frequency in a pause period (extended blanking period T_blank) in addition to a decrease in luminance due to the lights-off of the organic EL element (light-emitting diode 304) in a drive period (data refresh period T_refrech) in order to eliminate flicker visually recognized when pause driving (low-frequency driving) is performed (see paragraphs [0049] to [0052] and FIGS. 8A, 8B, 9A, and 9B). However, in this configuration, two types of scanning signals Scan1, Scan2 and two types of emission control signals EM1, EM2 are used to drive the pixel circuit (display pixel 22), and the luminance is reduced at an appropriate frequency by varying the scanning signal Scan2 and the emission control signal EM2 during the pause period as well. Therefore, during the pause period as well, the scanning-side drive circuit needs to be operated to generate the scanning signal Scan2 and the emission control signal EM2, and the power consumption cannot be reduced sufficiently.

Therefore, in a case where pause driving is performed in a current-driven display device such as an organic EL display device, it is desirable to perform favorable display in which flicker is not visually recognized while the power consumption of a scanning-side drive circuit, as well as a data-side drive circuit, can be reduced sufficiently when pause driving is performed.

Solution to Problem

Several embodiments of the disclosure provide a pixel circuit provided in a display device including a display portion that includes a plurality of data signal lines, a plurality of scanning signal lines intersecting the plurality of data signal lines, and a plurality of emission control lines disposed along the plurality of scanning signal lines, in such a manner that the pixel circuit corresponds to any one of the plurality of data signal lines, corresponds to any one of the plurality of scanning signal lines, and corresponds to any one of the plurality of emission control lines, the pixel circuit including:

a display element driven by a current;

a holding capacitor;

a drive transistor configured to control a current flowing through the display element in accordance with a data voltage held in the holding capacitor;

a write control switching element having a control terminal connected to a corresponding scanning signal line;

at least one emission control switching element that has a control terminal connected to a corresponding emission control line and is connected in series with the display element; and an initialization circuit configured to initialize the display element, wherein the initialization circuit includes a display element initialization switching element and is configured such that when a voltage of the corresponding emission control line is at a level for turning off the emission control switching element, an initialization voltage for initializing the display element is applied to the display element via the display element initialization switching element based on the voltage of the corresponding emission control line.

Several other embodiments of the disclosure provide a display device including a display portion that includes a plurality of data signal lines, a plurality of scanning signal lines intersecting the plurality of data signal lines, and a plurality of emission control lines disposed along the plurality of scanning signal lines, the display device including:

a plurality of pixel circuits disposed on the display portion along the plurality of data signal lines and the plurality of scanning signal lines so as to each correspond to any one of the plurality of data signal lines, correspond to any one of the plurality of scanning signal lines, and correspond to any one of the plurality of emission control lines;

a data-side drive circuit configured to generate a plurality of data signals indicating data voltages to be written to the plurality of pixel circuits and configured to apply the data signals to the plurality of data signal lines;

a scanning-side drive circuit configured to selectively drive the plurality of scanning signal lines and selectively deactivates the plurality of emission control lines; and a display control circuit configured to control the data-side drive circuit and the scanning-side drive circuit such that a drive period and a pause period appear alternately, the drive period including a refresh frame period during which data voltages are written to the plurality of pixel circuits by selective driving of the plurality of scanning signal lines, the pause period including a non-refresh frame period during which writing of data voltages to the plurality of pixel circuits is stopped with the plurality of scanning signal lines in an unselected state, wherein the pixel circuit including a display element driven by a current, a holding capacitor, a drive transistor configured to control a current flowing through the display element in accordance with a data voltage held in the holding capacitor, a write control switching element having a control terminal connected to a corresponding scanning signal line, at least one emission control switching element that has a control terminal connected to a corresponding emission control line and is connected in series with the display element, and an initialization circuit configured to initialize the display element, the initialization circuit includes a display element initialization switching element and is configured such that when a voltage of the corresponding emission control line is at a level for turning off the emission control switching element, an initialization voltage for initializing the display element is applied to the display element via the display element initialization switching element based on the voltage of the corresponding emission control line, and the display control circuit is configured to control the data-side drive circuit and the scanning-side drive circuit such that during the drive period, the data-side drive circuit generates the plurality of data signals and applies the generated data signals to the plurality of data signal lines, and the scanning-side drive circuit selectively drives the plurality of scanning signal lines and selectively deactivates the plurality of emission control lines, and control the data-side drive circuit and the scanning-side drive circuit such that during the pause period, the data-side drive circuit stops the application of the plurality of data signals to the plurality of data signal lines, and the scanning-side drive circuit stops the driving of each of the plurality of scanning signal lines and selectively deactivates the plurality of emission control lines.

Still other embodiments of the disclosure provide a drive method for a display device including a display portion that includes a plurality of data signal lines, a plurality of scanning signal lines intersecting the plurality of data signal lines, and a plurality of emission control lines disposed along the plurality of scanning signal lines, wherein the display device includes a plurality of pixel circuits disposed on the display portion along the plurality of data signal lines and the plurality of scanning signal lines so as to each correspond to any one of the plurality of data signal lines, correspond to any one of the plurality of scanning signal lines, and correspond to any one of the plurality of emission control lines, each of the pixel circuits includes a display element driven by a current, a holding capacitor, a drive transistor configured to control a current flowing through the display element in accordance with a data voltage held in the holding capacitor, a write control switching element that has a control terminal connected to a corresponding scanning signal line, at least one emission control switching element that has a control terminal connected to a corresponding emission control line and is connected in series with the display element, and an initialization circuit configured to initialize the display element, the initialization circuit includes a display element initialization switching element and is configured such that when a voltage of the corresponding emission control line is at a level for turning off the emission control switching element, an initialization voltage for initializing the display element is applied to the display element via the display element initialization switching element based on the voltage of the corresponding emission control line, the drive method comprises a pause drive step of driving the plurality of data signal lines and the plurality of scanning signal lines such that a drive period and a pause period appear alternately, the drive period including a refresh frame period during which data voltages are written to the plurality of pixel circuits by selective driving of the plurality of scanning signal lines, the pause period including a non-refresh frame period during which writing of data voltages to the plurality of pixel circuits is stopped with the plurality of scanning signal lines in an unselected state, and the pause drive step includes a step of generating a plurality of data signals that indicates data voltages to be written to the plurality of pixel circuits, applying the generated data signals to the plurality of data signal lines, selectively driving the plurality of scanning signal lines, and selectively deactivating the plurality of emission control lines during the drive period, and a step of stopping the application of the plurality of data signals to the plurality of data signal lines, stopping the driving of each of the plurality of scanning signal lines, and selectively deactivating the plurality of emission control lines during the pause period.

EFFECTS OF THE DISCLOSURE

According to some embodiments of the disclosure described above, in a display device including a display portion that includes a plurality of data signal lines, a plurality of scanning signal lines intersecting the plurality of data signal lines, and a plurality of emission control lines disposed along the plurality of scanning signal lines, in a pixel circuit provided to correspond to any one of the plurality of data signal lines, correspond to any one of the plurality of scanning signal lines, and correspond to any one of the plurality of emission control lines, the initialization circuit includes a display element initialization switching element and is configured such that when a voltage of the corresponding emission control line is at a level for turning off the emission control switching element, an initialization voltage for initializing the display element is applied to the display element via the display element initialization switching element based on the voltage of the corresponding emission control line. Therefore, as in the display device according to some other embodiments of the disclosure described above, in the display device in which such a pixel circuit is used, when pause driving is performed to drive the display portion such that a drive period including a refresh frame period and a pause period including a non-refresh frame period appear alternately, during the pause period, the application of the plurality of data signals to the plurality of data signal lines are stopped, the driving of each of the plurality of scanning signal lines is stopped, and the plurality of emission control lines are selectively deactivated, whereby in both the drive period (refresh frame period) and the pause period (non-refresh frame period), in response to the selective deactivation of the plurality of emission control lines, the emission control switching element is turned off in the pixel circuit, and the display element is supplied with an initialization voltage to come into the lights-off state. Therefore, regardless of the drive period or the pause period, the display element in the pixel circuit performs the lights-off operation at a high frequency in accordance with the luminance waveform having the same shape. As a result, even when pause driving is performed, flicker due to the lights-off operation of the display element in the pixel circuit is not visually recognized. Moreover, the lights-off operation is controlled by the emission control line, and the driving of each of the plurality of scanning signal lines can be completely stopped during the pause period. Therefore, when pause driving is performed, it is possible to perform favorable display in which flicker is not visually recognized while the power consumption of the scanning-side drive circuit, as well as the data-side drive circuit, can be reduced sufficiently when pause driving is performed.

DESCRIPTION OF EMBODIMENTS

Embodiments will be described below with reference to the accompanying drawings. In each transistor described below, a gate terminal corresponds to a control terminal, one of a drain terminal and a source terminal corresponds to a first conductive terminal, and the other corresponds to a second conductive terminal. One of a P-channel transistor and an N-channel transistor in each of the following embodiments corresponds to a transistor of a first conductivity type, and the other corresponds to a transistor of a second conductivity type. Further, the transistor in each of the following embodiments is, for example, a thin-film transistor, but the disclosure is not limited thereto. Moreover, the term "connection" in the present specification means "electrical connection" unless otherwise specified, and includes not only the case of meaning direct connection but also the case of meaning indirect connection via another element in the scope not deviating from the gist of the disclosure.

1. First Embodiment

<1.1 Overall Configuration>

Figure 1:
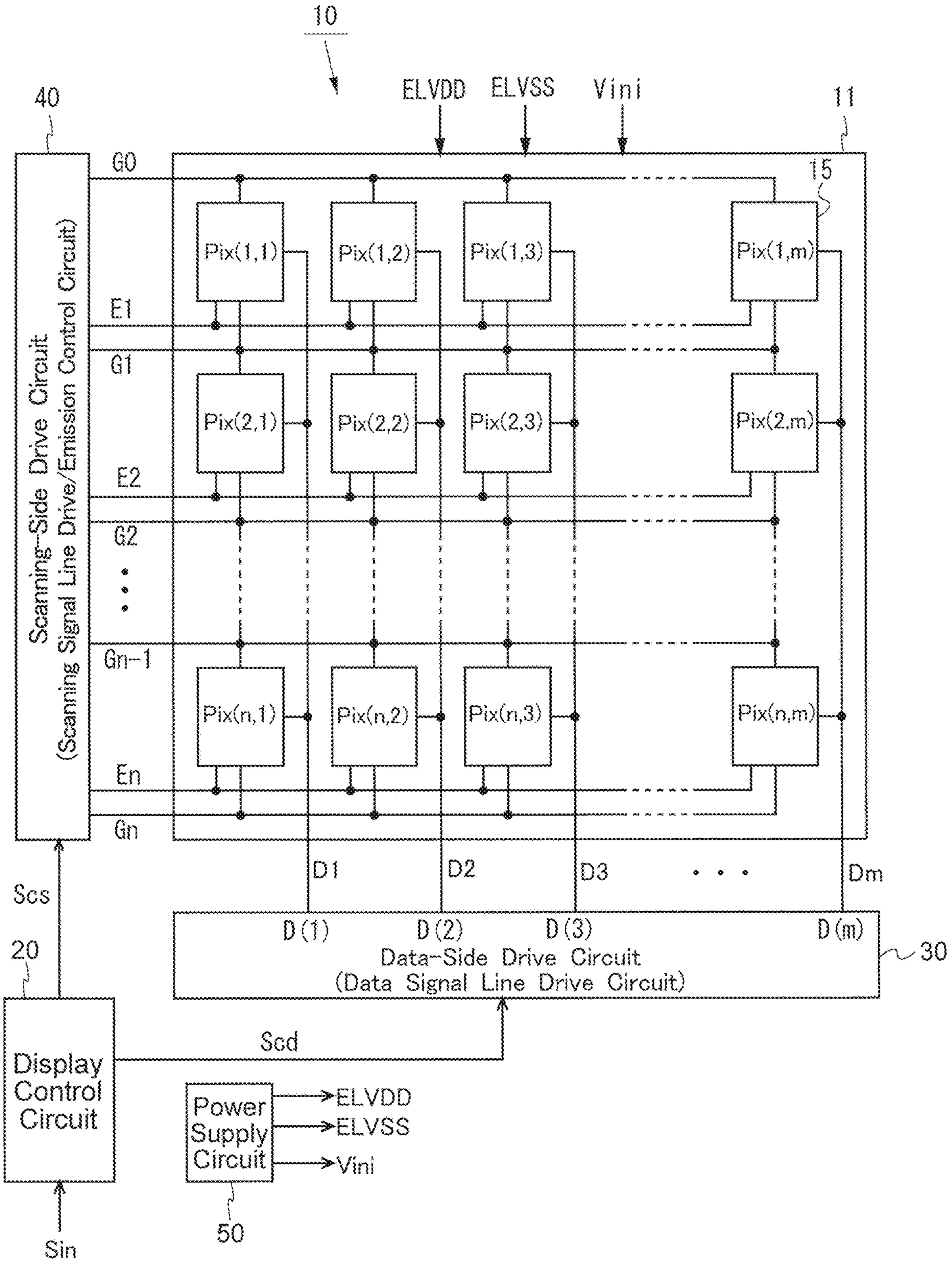
FIG. 1 is a block diagram illustrating an overall configuration of a display device according to a first embodiment.

FIG. 1 is a block diagram illustrating an overall configuration of an organic EL display device 10 according to a first embodiment. The display device 10 is an organic EL display device that performs internal compensation. In the display device 10, each pixel circuit has a function of compensating for variations and shifts in a threshold voltage of an internal drive transistor. The display device 10 has two operation modes of a normal drive mode and a pause drive mode. That is, in the normal drive mode, the display device 10 operates so that a refresh frame period Trf in which the image data (a data voltage in each pixel circuit) of the display portion is rewritten is continuous, and in the pause drive mode, a drive period TD and a pause period TP appear alternately, the drive period TD including only the refresh frame period Trf, the pause period TP including a plurality of non-refresh frame periods Tnrf during which rewriting of the image data (the data voltage in each pixel circuit) of the display portion is stopped (see FIG. 3 and the like to be described later).

As illustrated in FIG. 1, the display device 10 includes a display portion 11, a display control circuit 20, a data-side drive circuit 30, a scanning-side drive circuit 40, and a power supply circuit 50. The data-side drive circuit functions as a data signal line drive circuit (also referred to as "data driver"). The scanning-side drive circuit 40 functions as a scanning signal line drive circuit (also referred to as a "gate driver") and an emission control circuit (also referred to as an "emission driver"). In the configuration illustrated in FIG. 1, the two drive circuits are implemented as one scanning-side drive circuit 40, but the two drive circuits may be separated appropriately, or the two drive circuits may be separated and disposed on one side and the other side of the display portion 11. At least a part of each of the scanning-side drive circuit and the data signal line drive circuit may be integrally formed with the display portion 11. These points also apply to other embodiments and modifications to be described later. The power supply circuit 50 generates a high-level power supply voltage ELVDD, a low-level power supply voltage ELVSS, and an initialization voltage Vini, described later, to be supplied to the display portion 11, and a power supply voltage (not illustrated) to be supplied to each of the display control circuit 20, the data-side drive circuit 30, and the scanning-side drive circuit 40.

In the display portion 11, m (m is an integer of 2 or more) data signal lines D1 to Dm and n+1 (n is an integer of 2 or more) scanning signal lines G0 to Gn intersecting the data signal lines D1 to Dm are disposed, and n emission control lines (emission lines) E1 to En are disposed along the n scanning signal lines G1 to Gn, respectively. The display portion 11 is provided with m×n pixel circuits 15 arranged in a matrix along the m data signal lines D1 to Dm and the n scanning signal lines G1 to Gn, and each pixel circuit 15 corresponds to any one of the m data signal lines D1 to Dm and corresponds to any one of the n scanning signal lines G1 to Gn (hereinafter, in the case of distinguishing the pixel circuits 15 from each other, the pixel circuit corresponding to the ith scanning signal line Gi and the jth data signal line Dj is also referred to as "the pixel circuit in the ith row and the jth column" and denoted by reference symbol "Pix(i, j)"). The n emission control lines E1 to En correspond to the n scanning signal lines G1 to Gn, respectively. Therefore, each pixel circuit 15 corresponds to any one of the n emission control lines E1 to En.

A power line (not illustrated) common to each pixel circuit 15 is disposed in the display portion 11. That is, a first power line and a second power line are disposed, the first power line being configured to supply a high-level power supply voltage ELVDD for driving the organic EL element to be described later (hereinafter, the line will be referred to as the "high-level power line" and denoted by the same symbol "ELVDD" as the high-level power supply voltage), the second power line being configured to supply a low-level power supply voltage ELVSS for driving the organic EL element (hereinafter, the line will be referred to as the "low-level power line" and denoted by the same symbol "ELVSS" as the low-level power supply voltage). More specifically, the low-level power line ELVSS is a cathode common to the plurality of pixel circuits 15. Further, an initialization voltage line for supplying an initialization voltage Vini to be used in a reset operation (also referred to as an "initialization operation") for initializing each pixel circuit 15 (the line is denoted by the same symbol "Vini" as the initialization voltage) is also disposed in the display portion 11. The high-level power supply voltage ELVDD, the low-level power supply voltage ELVSS, and the initialization voltage Vini are supplied from the power supply circuit 50.

The display control circuit 20 receives an input signal Sin including image information representing an image to be displayed and timing control information for image display from the outside of the display device 10, generates a data-side control signal Scd and a scanning-side control signal Scs based on the input signal Sin, and outputs the data-side control signal Scd and the scanning-side control signal Scs to the data-side drive circuit 30 and the scanning-side drive circuit 40, respectively.

The data-side drive circuit 30 drives the data signal lines D1 to Dm based on the data-side control signal Scd from the display control circuit 20. That is, based on the data-side control signal Scd, the data-side drive circuit 30 outputs m data signals D(1) to D(m) representing an image to be displayed in parallel and applies the data signals to the data signal lines D1 to Dm, respectively.

The scanning-side drive circuit 40 functions as a scanning signal line drive circuit for driving the scanning signal lines G0 to Gn and an emission control circuit for driving the emission control lines E1 to En based on the scanning-side control signal Scs from the display control circuit 20.

More specifically, during the refresh frame period Trf, the scanning-side drive circuit 40 sequentially selects the scanning signal lines G0 to Gn for a predetermined period corresponding to one horizontal period based on the scanning-side control signal Scs as the scanning signal line drive circuit, applies an active signal (low-level voltage) to the selected scanning signal line Gk, and applies an inactive signal (high-level voltage) to the non-selected scanning signal line. Thus, m pixel circuits Pix(k, 1) to Pix(k, m) corresponding to the selected scanning signal lines Gk ($1 \leq k \leq n$) are selected collectively. As a result, the voltages of the m data signals D(1) to D(m) (hereinafter, these voltages may be simply referred to as "data voltages" without distinction) applied from the data-side drive circuit 30 to the data signal lines D1 to Dm in a selection period for the scanning signal line Gk (hereinafter referred to as "kth scanning selection period") are written as pixel data to the pixel circuits Pix(k, 1) to Pix(k, m), respectively.

During the refresh frame period Trf, the scanning-side drive circuit 40 drives the emission control lines E1 to En so that they are selectively deactivated in conjunction with the driving of the scanning signal lines G1 to Gn. That is, as the emission control circuit, based on the scanning-side control signal Scs, the scanning-side drive circuit 40 applies an emission control signal (high-level voltage) indicating non-light emission to an ith emission control line Ei during a predetermined period including the ith horizontal period and applies an emission control signal (low-level voltage) indicating light emission during the other periods (i=1 to n). While the voltage of the emission control line Ei is at a low level (activated state), the organic EL elements in the pixel circuits Pix(i, 1) to Pix(i, m) corresponding to the ith scanning signal line Gi (hereinafter also referred to as "pixel circuits in the ith row") emit light with luminance corresponding to the data voltages written respectively in the pixel circuits Pix(i, 1) to Pix(i, m) in the ith row.

<1.2 Overall Operation>

Figure 10:
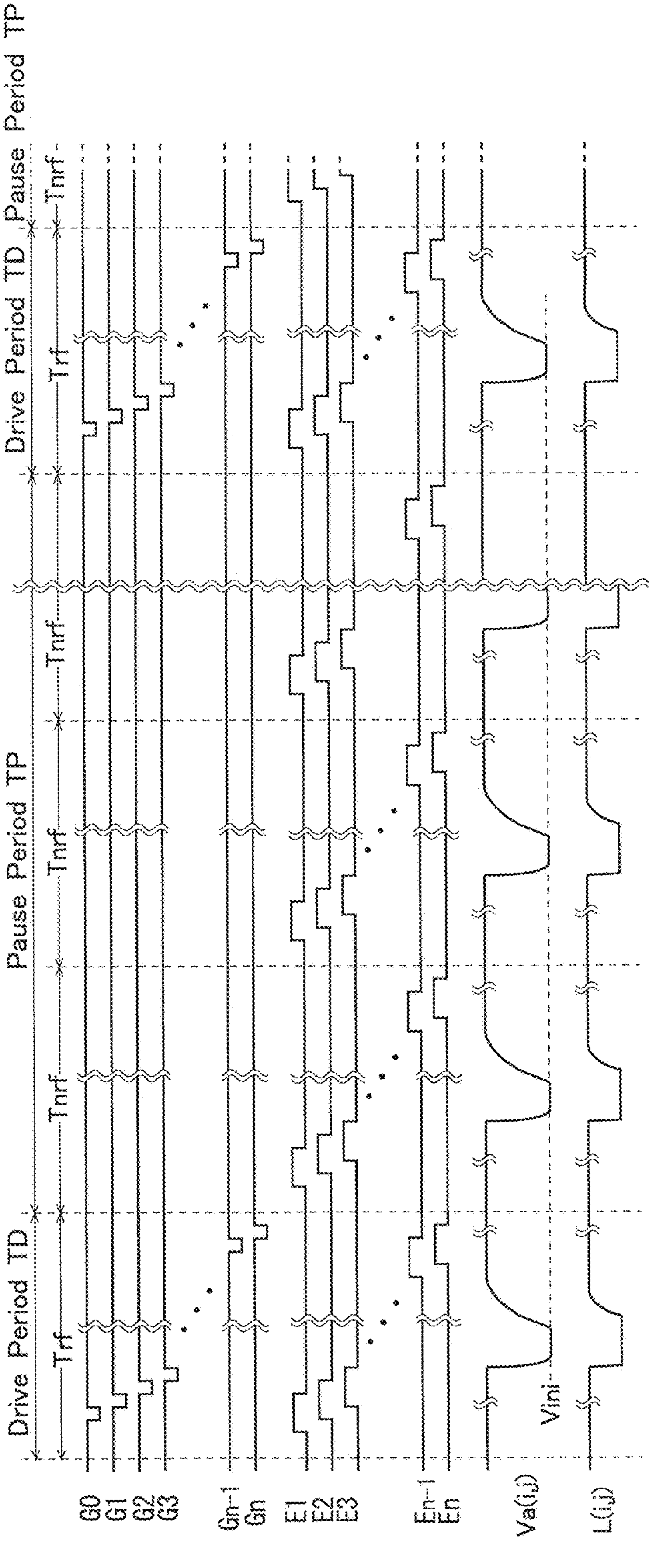
FIG. 10 is a signal waveform diagram for describing a drive method in a pause drive mode according to the first embodiment.

Next, an overall operation of the display device 10 according to the present embodiment will be described. As described above, the display device 10 has two operation modes of a normal drive mode and a pause drive mode. In the normal drive mode, a refresh frame period (hereinafter referred to also as an "RF frame period") Trf, during which the scanning signal lines G0 to G1 are sequentially selected in one frame period and image data is written to (the pixel circuits Pix(1,1) to Pix(n, m) of) the display portion 11, is repeated. In contrast, in the pause drive mode, as illustrated in FIG. 10 to be described later, the drive period TD and the pause period TP are repeated alternately, the drive period TD including only such an RF frame period Trf, the pause period TP including a plurality of non-refresh frame periods (hereinafter also referred to as "NRF frame" periods) Tnrf during which the scanning signal lines G0 to G1 are maintained in an unselected state and writing of image data to the display portion 11 is stopped. In the pause drive mode, the scanning-side and data-side drive circuits are stopped during the pause period TP, and display by the image data written in the immediately preceding drive period TD (RF frame period Trf) continues. Hence the pause drive mode is effective in reducing the power consumption of the display device when a still image is displayed. Note that, in the example of FIG. 10, the drive period TD includes only one RF frame period Trf but may include two or more RF frame periods Trf.

The input signal Sin from the outside includes an operation mode signal Sm indicating which of the normal drive mode and the pause drive mode is to be used to drive the display portion 11. The operation mode signal Sm is applied to the scanning-side drive circuit 40 as a part of the scanning-side control signal Scs and is applied to the data-side drive circuit 30 as a part of the data-side control signal Scd. The scanning-side drive circuit 40 drives the scanning signal lines G0 to Gn and the emission control lines E1 to En in accordance with the operation mode indicated by the operation mode signal Sm, and the data-side drive circuit 30 drives the data signal lines D1 to Dn in accordance with the operation mode indicated by the operation mode signal Sm. Since the problem of the present application is not related to the normal drive mode, the operation of the display device 10 or the pixel circuit thereof will be described below focusing on the operation in the pause drive mode (the same applies to the other embodiments described below).

In the present embodiment, for each pixel circuit Pix(i, j), the data write operation is performed when the scanning signal line Gi corresponding thereto is in the selected state, the reset operation is performed when the scanning signal line Gi-1 immediately before the scanning signal line Gi is in the selected state, and the emission control line Ei is driven so that each pixel circuit Pix(i, j) is in the non-light-emitting state in the period in which the data write operation and the reset operation are performed (i=1 to N). That is, as illustrated in FIG. 3, in the RF frame period Trf, the emission control lines E1 to En sequentially come into the deactivated state for two or more horizontal periods (for three horizontal periods in the example of FIG. 10) so as to interlock with the driving of the scanning signal lines G0 to Gn. As will be described later, in the pixel circuit Pix(i, j) in the present embodiment, P-channel transistors are used as first and second emission control transistors M5, M6 (see FIG. 2 to be described later), and thus, each emission control line Ei comes into the activated state when a low-level (L-level) voltage is applied, and comes into a deactivated state when a high-level (H-level) voltage is applied.

<1.3 Configuration and Operation of Pixel Circuit in Known Example>

Next, before the configuration and operation of the pixel circuit 15 in the present embodiment are described, for comparison, a configuration and operation of a pixel circuit in a known example will be described with reference to FIGS. 2 and 3.

Figure 2:
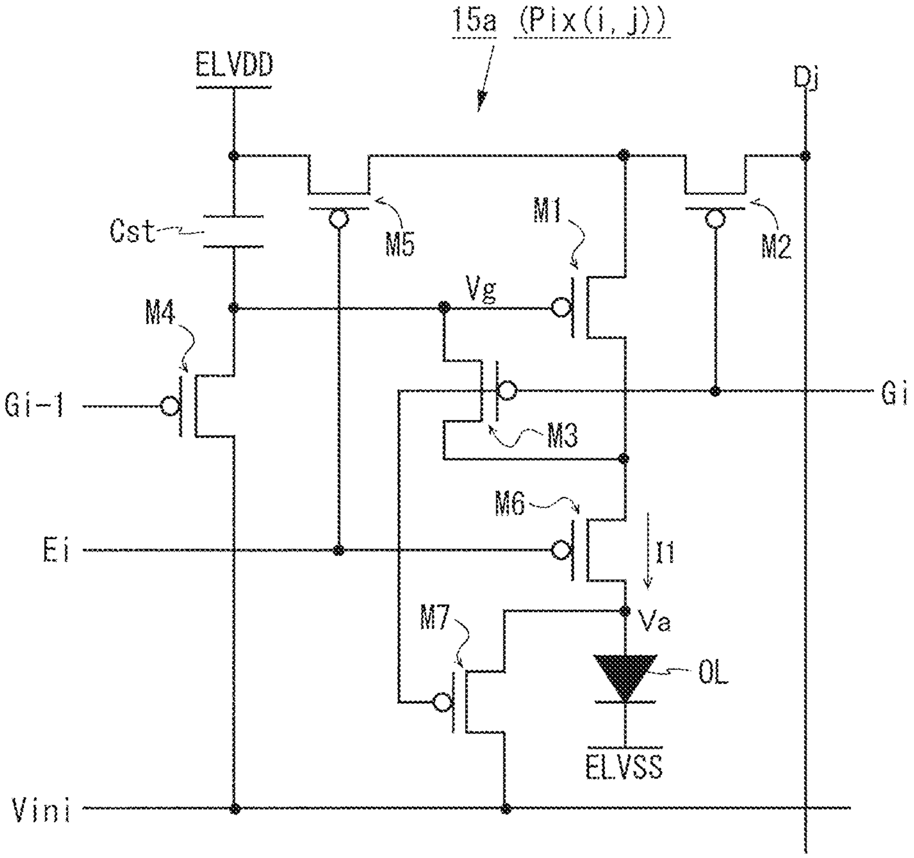
FIG. 2 is a circuit diagram illustrating a configuration of a pixel circuit in a known organic EL display device (known example).
Figure 3:
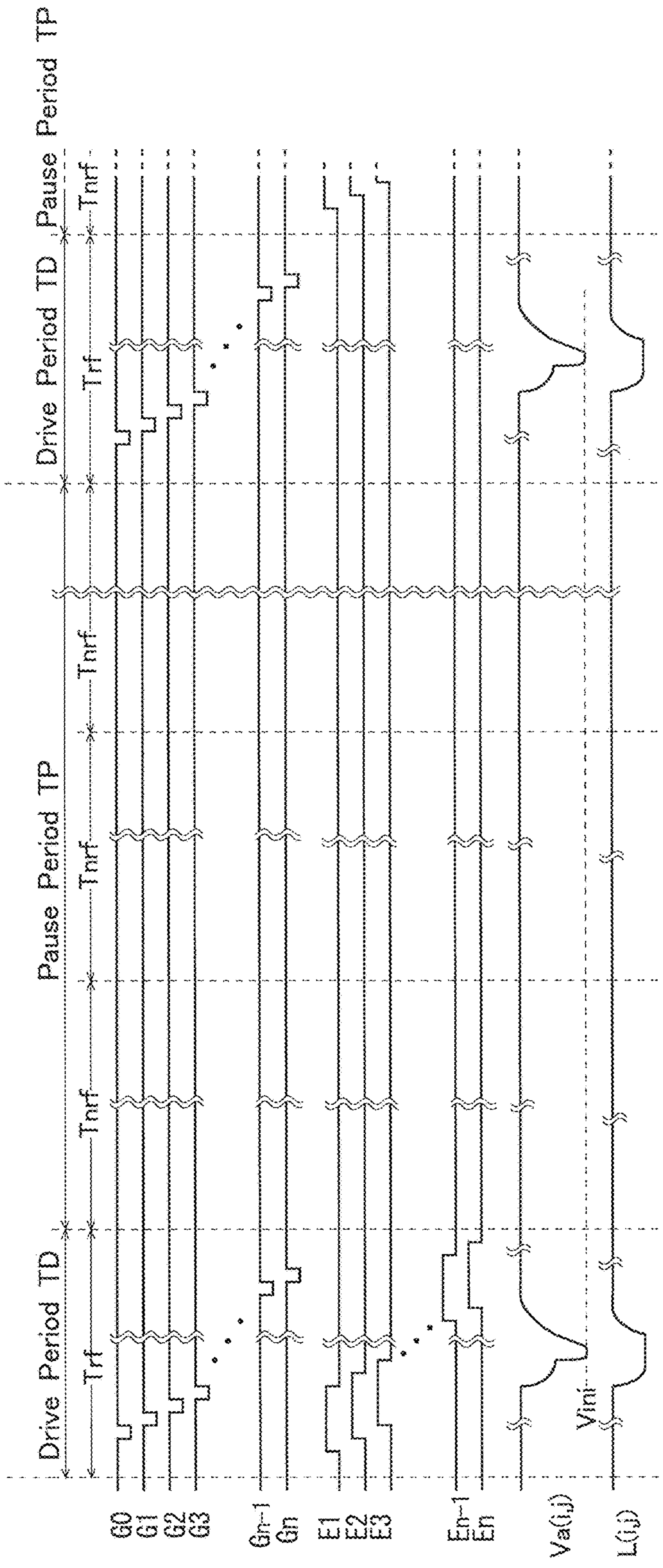
FIG. 3 is a signal waveform diagram for describing a drive method in a pause drive mode according to the known example.

FIG. 2 is a circuit diagram illustrating a configuration of a pixel circuit 15*a* in a known example as a base of the pixel circuit 15 in the present embodiment, and more specifically, it is a circuit diagram illustrating the configuration of the pixel circuit 15*a* corresponding to the ith scanning signal line Gi and the jth data signal line Dj, that is, the pixel circuit Pix(i, j) in the ith row and the jth column (1≤i≤n, 1≤j≤m). The pixel circuit 15*a* includes an organic EL element OL as a display element, a drive transistor M1, a holding capacitor Cst, a write control transistor M2, a threshold compensation transistor M3, a transistor (hereinafter referred to as a "control voltage initialization transistor") M4 for initializing a voltage of a control terminal (gate terminal) of the drive transistor M1, a first emission control transistor M5, a second emission control transistor M6, and a transistor (hereinafter referred to as an "OLED initialization transistor") M7 for initializing an organic EL element OL. In the pixel circuit 15*a*, the transistors M2 to M7 except for the drive transistor M1 function as switching elements.

The pixel circuit 15*a* is connected with a scanning signal line (hereinafter also referred to as "corresponding scanning signal line" in the description focusing on the pixel circuit) Gi corresponding to the pixel circuit 15*a*, a scanning signal line Gi-1 immediately before the corresponding scanning signal line Gi (a scanning signal line immediately before in the scanning order of the scanning signal lines G1 to Gn, hereinafter also referred to as "preceding scanning signal line" in the description focusing on the pixel circuit), an emission control line (hereinafter also referred to as "corresponding emission control line" in the description focusing on the pixel circuit) Ei corresponding to the pixel circuit 15*a*, a data signal line (hereinafter also referred to as "corresponding data signal line" in the description focusing on the pixel circuit) Dj corresponding to the pixel circuit 15*a*, an initialization voltage line Vini, a high-level power line ELVDD, and a low-level power line ELVSS.

As illustrated in FIG. 2, in the pixel circuit 15*a*, the source terminal as the first conductive terminal of the drive transistor M1 is connected to the corresponding data signal line Dj via the write control transistor M2 and is connected to the high-level power line ELVDD via the first emission control transistor M5. The drain terminal as the second conductive terminal of the drive transistor M1 is connected to the anode electrode as the first electrode of the organic EL element OL via the second emission control transistor M6. The gate terminal as the control terminal of the drive transistor M1 is connected to the high-level power line ELVDD via the holding capacitor Cst, is connected to the drain terminal of the drive transistor M1 via the threshold compensation transistor M3 and is connected to the initialization voltage line Vini via the control voltage initialization transistor M4. The anode electrode of the organic EL element OL is connected to the initialization voltage line Vini via the OLED initialization transistor M7, and the cathode electrode as the second electrode of the organic EL element OL is connected to the low-level power line ELVSS. The gate terminals of the write control transistor M2, the threshold compensation transistor M3, and the OLED initialization transistor M7 are connected to the corresponding scanning signal line Gi, the gate terminals of the first and second emission control transistors M5, M6 are connected to the corresponding emission control line Ei, and the gate terminal of the control voltage initialization transistor M4 is connected to the preceding scanning signal line Gi-1.

Figure 4:
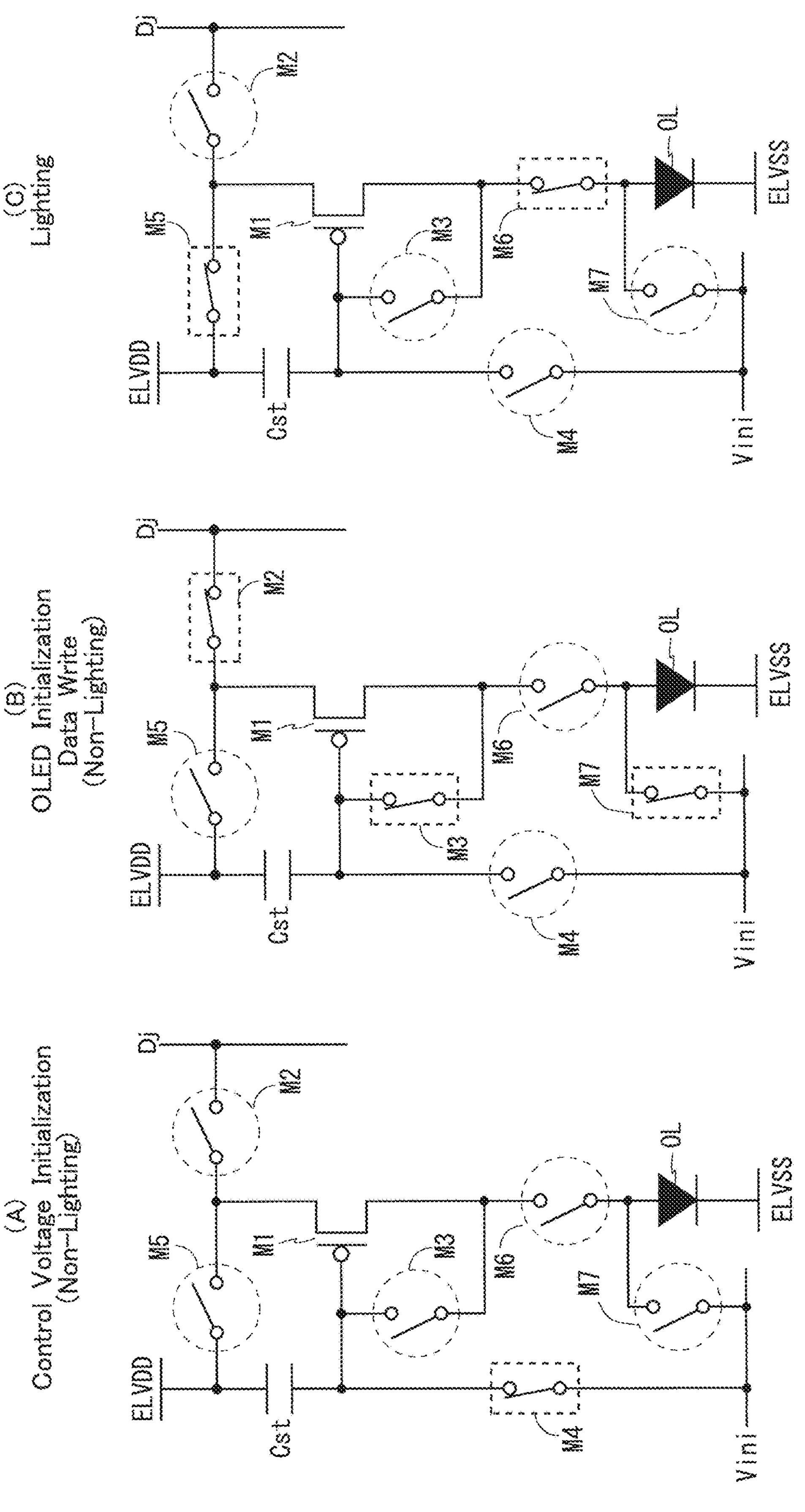
FIG. 4 provides (A) a circuit diagram for describing a control voltage initialization operation of a pixel circuit in a drive period according to the known example, (B) a circuit diagram for describing an organic light-emitting diode (OLED) initialization operation and a data write operation of the pixel circuit, and (C) a circuit diagram for describing a lighting operation of the pixel circuit.
Figure 6:
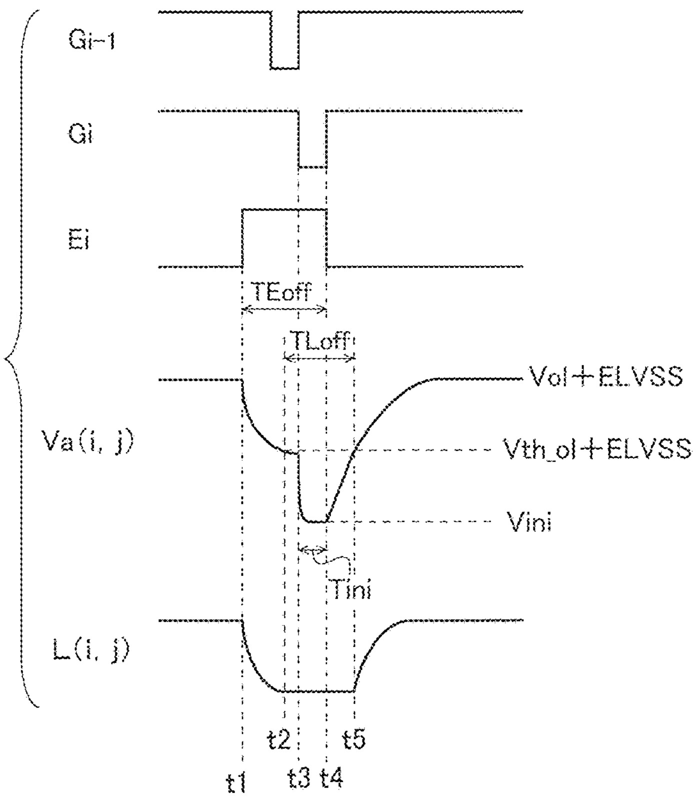
FIG. 6 is a detailed signal waveform diagram for describing a lights-off operation in a refresh frame period according to each of the known example and the improved example.

FIG. 3 is a signal waveform diagram for describing the drive method in the pause drive mode according to the above known example and illustrates the voltage waveforms of the signal lines Gi, Ei together with waveforms of an anode voltage Va(i, j) and the emission luminance L(i, j) of the pixel circuit Pix(i, j). (A) of FIG. 4 is a circuit diagram for describing an operation (hereinafter referred to also as a "control voltage initialization operation") of initializing the voltage of the control terminal (gate terminal) of the drive transistor M1 by applying an initialization voltage to the holding capacitor Cst in the pixel circuit 15*a* in the RF frame period as the drive period TD when the known example operates in the pause drive mode, (B) of FIG. 4 is a circuit diagram for describing a write operation of a data voltage to the pixel circuit 15*a* in the RF frame period (hereinafter referred to also as a "data write operation") and an initialization operation of the organic EL element OL in the pixel circuit 15*a* (hereinafter referred to also as an "OLED initialization operation"), and (C) of FIG. 4 is a circuit diagram for describing the lighting operation of the pixel circuit 15*a* in the RF frame period. FIG. 6 is a detailed signal waveform diagram for describing the lights-off operation of the pixel circuit Pix(i, j) in the RF frame period Trf. In the present specification, when the voltage (anode voltage) Va of the anode electrode of the organic EL element OL in the pixel circuit Pix(i, j) is distinguished from the anode voltage in other pixel circuits, a reference sign "Va(i, j)" is used.

Hereinafter, the operation in the RF frame period Trf that is the drive period TD of the pixel circuit 15*a* illustrated in FIG. 2, that is, the pixel circuit Pix(i, j) in the ith row and the jth column in the known example, will be described with reference to FIGS. 4 and 6 together with FIG. 2.

When the voltage of the corresponding emission control line Ei of the pixel circuit Pix(i, j) changes from the L level to the H level at time t1, the first and second emission control transistors M5, M6 change from an on-state to an off-state, whereby the anode voltage Va(i, j) starts to decrease from time t1 as illustrated in FIG. 6. Thereafter, when the voltage of the preceding scanning signal line Gi-1 changes from the H level to the L level, the control voltage initialization transistor M4 changes from the off-state to the on-state, whereby the holding capacitor Cst is initialized, and the voltage (hereinafter referred to as "gate voltage") Vg of the gate terminal of the drive transistor M1 becomes the initialization voltage Vini. (A) of FIG. 4 schematically illustrates a state of the pixel circuit Pix(i, j) at this time, that is, a circuit state during the control voltage initialization operation. In (A) of FIG. 4, a dotted circle indicates that a transistor as a switching element therein is in the off-state, and a dotted rectangle indicates that a transistor as a switching element therein is in the on-state. Such an expression method is also adopted in (B) and (C) of FIG. 4 to be described later and is also adopted in FIGS. 8, 11, 12, 22, and 23 to be described later.

When the anode voltage Va(i, j) decreases and reaches a voltage Vth_ol+ELVSS at time t2, the organic EL element OL comes into a lights-off state. Here, "Vth_ol" indicates the threshold voltage of the organic EL element OL (hereinafter referred to as an "OLED threshold voltage"). As described above, "ELVSS" is a low-level power supply voltage. In FIG. 6, "L(i, j)" indicates the luminance of the organic EL element OL in the pixel circuit Pix(i, j).

Thereafter, when the voltage of the corresponding scanning signal line Gi changes from the H level to the L level at time t3, the OLED initialization transistor M7 changes from the off-state to the on-state, whereby the organic EL element OL is initialized, and the anode voltage Va(i, j) becomes the initialization voltage Vini. (B) of FIG. 4 schematically illustrates a state of the pixel circuit Pix(i, j) at this time, that is, a circuit state during the OLED initialization operation. At this time, the voltage of the preceding scanning signal line Gi-1 is at the H level, and hence the control voltage initialization transistor M4 is in the off-state.

In addition, when the voltage of the corresponding scanning signal line Gi changes to the L level at time t3, the write control transistor M2 and the threshold compensation transistor M3 are turned on, so that the voltage of the corresponding data signal line Dj is applied as the data voltage Vdata to the holding capacitor Cst via the drive transistor M1 in the diode-connected state (see (B) of FIG. 4). As a result, when the threshold of the drive transistor M1 is Vth, a gate voltage Vg(i, j) changes toward a value given by Formula (1) below.

$$Vg(i,j)=Vdata-|Vth| \quad (1)$$

That is, in the selection period from t3 to t4 (the OLED initialization period Tini illustrated in FIG. 6) during which the voltage of the corresponding scanning signal line Gi is at the L level, the data voltage subjected to threshold compensation is written to the holding capacitor Cst, and the gate voltage Vg(i, j) becomes a value given by Formula (1) above.

Thereafter, when the voltage of the corresponding scanning signal line Gi changes to the H level at time t4, the write control transistor M2, the threshold compensation transistor M3, and the OLED initialization transistor M7 are turned off. At time t4 (or immediately thereafter), the voltage of the corresponding emission control line Ei changes to the L level, whereby the first and second emission control transistors M5, M6 are turned on, a non-emission period TEoff ends, and an emission period starts. (C) of FIG. 4 schematically illustrates a state of the pixel circuit Pix(i, j) in the emission period, that is, the circuit state in the lighting operation. During the emission period, a current I1 flows from the high-level power line ELVDD to the low-level power line ELVSS via the first emission control transistor M5, the drive transistor M1, the second emission control transistor M6, and the organic EL element OL. During the emission period, the drive transistor M1 operates in a saturation region, and the current I1 is given by Formula (2) below. A gain β of the drive transistor M1 included in Formula (2) is given by Formula (3) below.

$$\begin{aligned} I1 &= (\beta/2)(|Vgs| - |Vth|)^2 \quad (2) \\ &= (\beta/2)(|Vg - ELVDD| - |Vth|)^2 \end{aligned}$$

$$\beta = \mu \times (W/L) \times Cox \quad (3)$$

In Formulas (2) and (3) above, Vgs, μ, W, L, and Cox represent the gate-source voltage, the mobility, the gate width, the gate length, and the gate insulating film capacitance per unit area of the drive transistor M1, respectively. Considering that the drive transistor M1 is of P-channel type and ELVDD>Vg, the current I1 is given by the following Formula from Formulas (1) and (2) above.

$$\begin{aligned} I1 &= (\beta/2)(ELVDD - Vg - |Vth|)^2 \quad (4) \\ &= (\beta/2)(ELVDD - Vdata)^2 \end{aligned}$$

As described above, in the emission period, regardless of the threshold Vth of the drive transistor M1, the drive current I1 corresponding to the data voltage Vdata, which is the voltage of the corresponding data signal line Dj in the selection period from t3 to t4 of the corresponding scanning signal line Gi, flows through the organic EL element OL, whereby the organic EL element OL emits light with luminance in accordance with the data voltage Vdata. The timing for starting light emission is as follows.

As described above, when the first and second emission control transistors M5, M6 change to the on-state at time t4, the parasitic capacitance of the organic EL element OL is charged by the current I1 after time t4, whereby the anode voltage Va(i, j) starts to rise from the initialization voltage Vini. When the anode voltage Va(i, j) reaches a voltage (hereinafter referred to as an "OLED threshold corresponding voltage") Vth_ol+ELVSS corresponding to the OLED threshold voltage Vth_ol at the subsequent time t5, the luminance L(i, j) of the organic EL element OL starts to increase from the value at the time of lights-off as illustrated in FIG. 6. That is, the organic EL element OL starts to emit light. Therefore, in the RF frame period Trf, a period from the time point t2 when the anode voltage Va(i, j) decreases due to the turn-off of the first and second emission control transistors M5, M6 and reaches the OLED threshold corresponding voltage Vth_ol+ELVSS to the time point t5 when the anode voltage Va(i, j) rises above the initialization voltage Vini due to the turn-on of the first and second emission control transistors M5, M6 and reaches the OLED threshold corresponding voltage Vth_ol+ELVSS is a lights-off period (hereinafter referred to as "OLED lights-off period" or simply "lights-off period") TLoff of the organic EL element OL.

In this way, in the drive period TD (RF frame period Trf), the lights-off period TLoff as described above occurs for each pixel circuit 15*a*. However, as illustrated in FIG. 3, during the pause period TP (each NRF frame period Tnrf), since the driving of each of the scanning signal lines G0 to Gn and the emission control lines E1 to En is stopped, the lighting of the organic EL element OL continues in each pixel circuit 15*a*, and the lights-off period TLoff does not occur. On the other hand, in the pause drive mode, since the pause period TP is longer than the drive period TD, a refresh cycle becomes longer (e.g., a length of 33.4 ms or more), and accordingly, the interval at which the lights-off period TLoff described above occurs also becomes longer. Therefore, when pause driving is performed in the known example, a decrease in luminance due to the lights-off of the organic EL element OL every RF frame period Trf is visually recognized as flicker, and the display quality deteriorates.

<1.4 Drive Method for Pixel Circuit and Operation Based on Drive Method in Improved Example>

Figure 5:
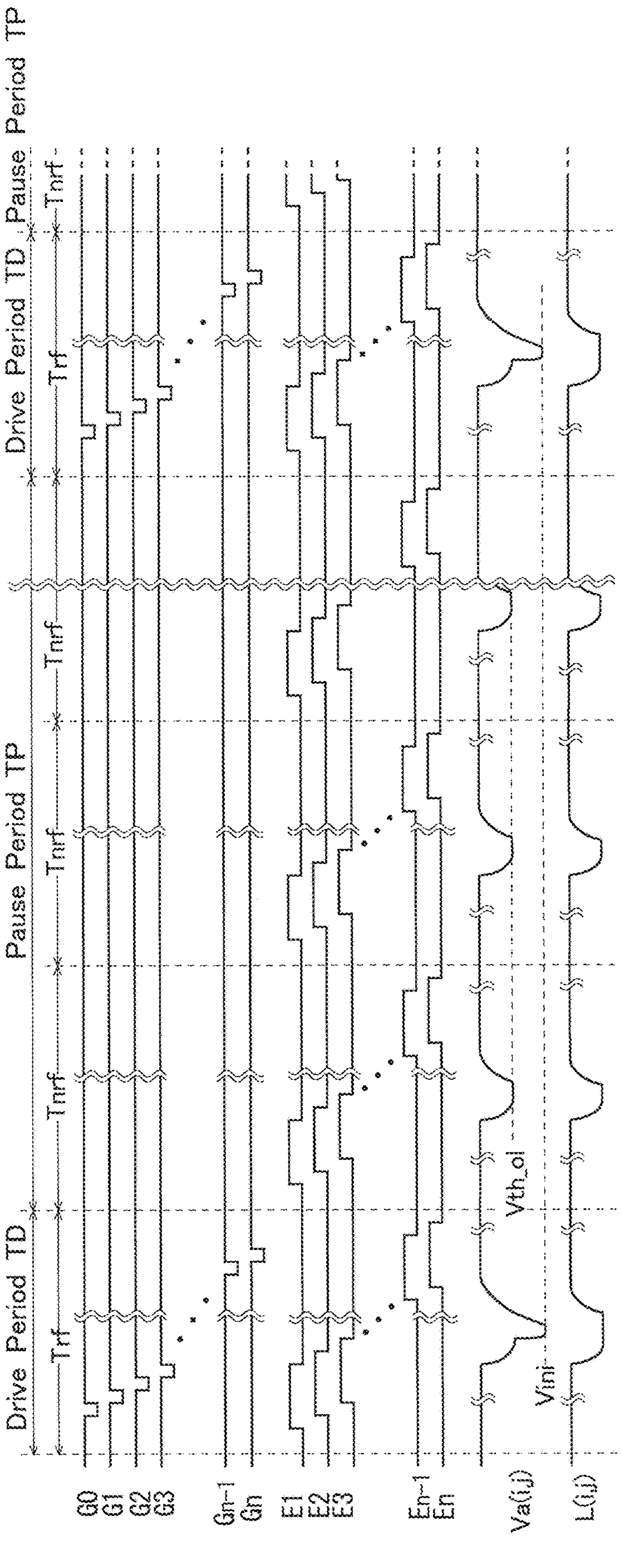
FIG. 5 is a signal waveform diagram for describing a drive method in a pause drive mode in an organic EL display device (improved example) obtained by improving the known example.

In order to prevent the flicker that occurs when the pause driving is performed in the known example, as illustrated in FIG. 5, it is conceivable to drive the emission control lines E1 to En in the same manner as the drive period TD (RF frame period Trf) also in each NRF frame period Tnrf included in the pause period TP (hereinafter, the organic EL display device as thus configured is referred to as an "improved example"). Next, the operation of the pixel circuit in this improved example will be described. Hereinafter, in the configuration of this improved example, the same or corresponding parts as those in the known example are denoted by the same reference numerals, and a detailed description thereof is omitted. Note that the pixel circuit Pix(i, j) in the improved example has the same configuration as the pixel circuit 15*a* in the above known example (see FIG. 2).

In this improved example, as illustrated in FIG. 5, during the RF frame period Trf as the drive period TD, the scanning signal lines G0 to Gn and the emission control lines E1 to En are driven in the same manner as in the above known example, and the data signal lines D1 to Dm are also driven in the same manner (the waveforms of the data signal lines D1 to Dm are not illustrated). Therefore, each pixel circuit Pix(i, j) operates in the same manner as in the known example (see FIGS. 4 and 6).

In contrast, during the pause period TP, as illustrated in FIG. 5, the driving of each of the scanning signal lines G0 to Gn and the data signal lines D1 to Dm is stopped, but the emission control lines E1 to En are driven so as to be sequentially deactivated in each NRF frame period Tnrf. Thus, only a part in the scanning-side drive circuit 40 for driving the emission control lines E1 to En operates, the data-side drive circuit 30 stops the operation, and the data signals D(1) to D(m) representing the images to be displayed are not applied to the data signal lines D1 to Dm.

Figure 7:
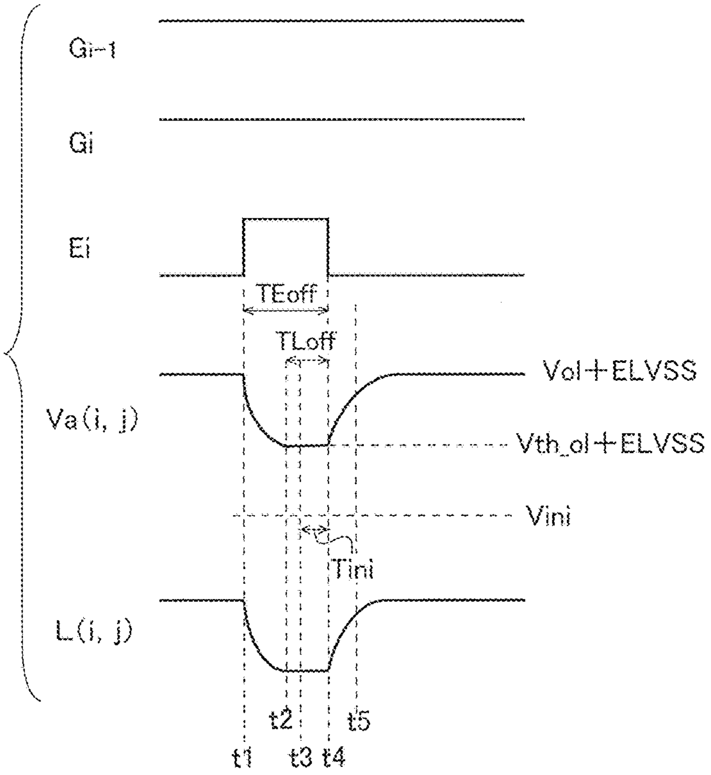
FIG. 7 is a detailed signal waveform diagram for describing a lights-off operation in a non-refresh frame period according to the improved example.
Figure 8:
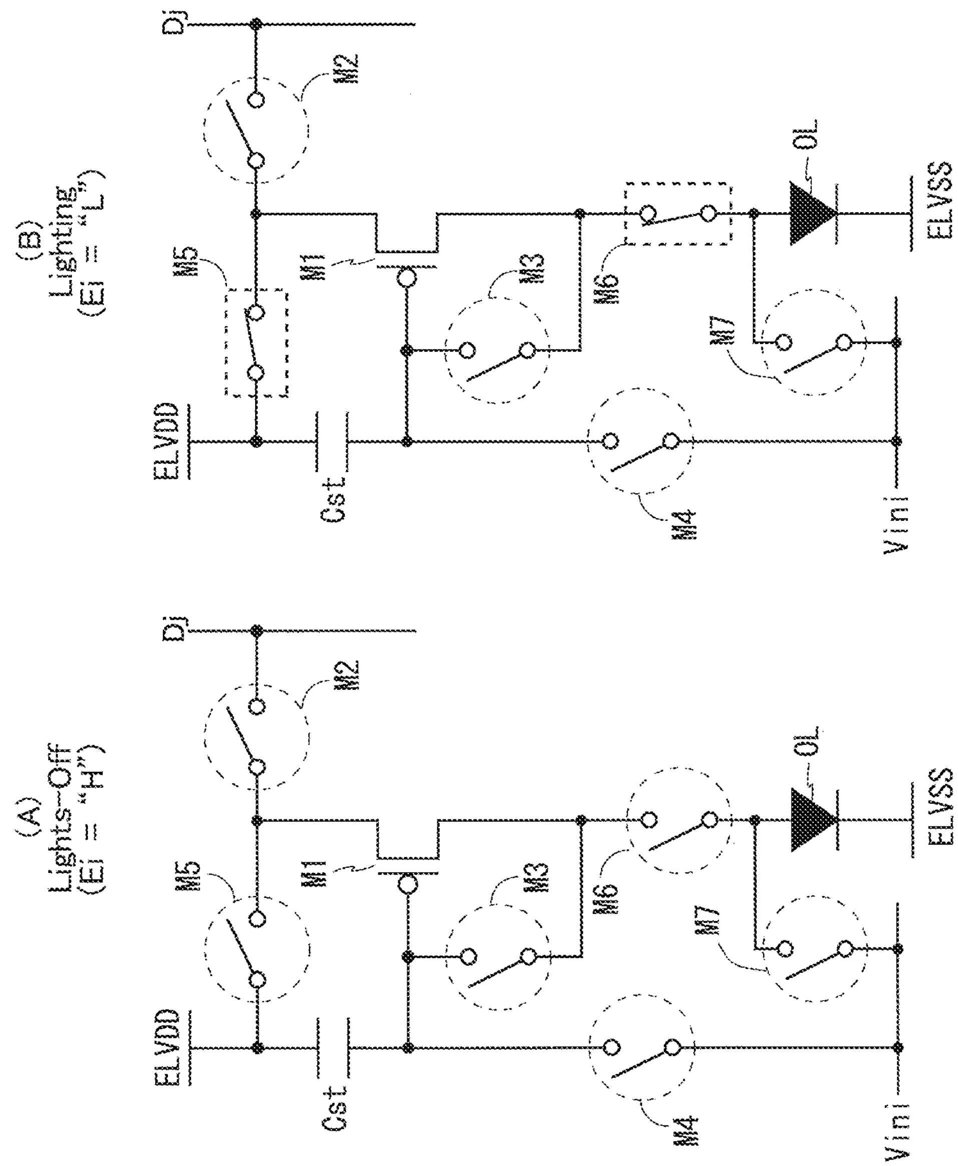
FIG. 8 provides (A) a circuit diagram for describing a lights-off operation of a pixel circuit in a pause period according to the improved example, and (B) a circuit diagram for describing a lighting operation of the pixel circuit.

FIG. 7 is a detailed signal waveform diagram for describing the lights-off operation of the pixel circuit Pix(i, j) in each NRF frame period Tnrf in the pause period TP. (A) of FIG. 8 is a circuit diagram for describing the lights-off operation of the pixel circuit 15*a* in each NRF frame period Tnrf included in the pause period TP when the above improved example operates in the pause drive mode, and (B) of FIG. 8 is a circuit diagram for describing the lighting operation of the pixel circuit 15*a* in each NRF frame period Tnrf. Hereinafter, the operation of the pixel circuit Pix(i, j) in the ith row and the jth column in the above improved example in each NRF frame period will be described with reference to FIGS. 7 and 8 together with FIG. 2.

In the NRF frame period Tnrf as well, when the voltage of the corresponding emission control line Ei of the pixel circuit Pix(i, j) changes from the L level to the H level at time t1, the first and second emission control transistors M5, M6 change from an on-state to an off-state, whereby the anode voltage Va(i, j) starts to decrease from time t1 as illustrated in FIG. 7. However, in the NRF frame period Tnrf, unlike the RF frame period Trf (drive period TD), since the voltages of the preceding scanning signal line Gi-1 and the corresponding scanning signal line Gi are both maintained at the H level (unselected state), when the organic EL element OL comes into the lights-off state at a time point t2 when the anode voltage Va(i, j) decreases and reaches the OLED threshold corresponding voltage Vth_ol+ELVSS, the anode voltage Va(i, j) is maintained at the voltage Vth_ol+ELVSS after the time point t2. (A) of FIG. 8 schematically illustrates a state of the pixel circuit Pix(i, j) at this time, that is, a circuit state during the lights-off operation.

Thereafter, at time t4, the voltage of the corresponding emission control line Ei changes from the H level to the L level, whereby the first and second emission control transistors M5, M6 are turned on, the non-emission period TEoff ends, and the organic EL element OL starts to emit light. Therefore, in the NRF frame period Tnrf, a period from the time point t2 at which the anode voltage Va(i, j) decreases due to the turn-off of the first and second emission control transistors M5, M6 and reaches the OLED threshold corresponding voltage Vth_ol+ELVSS to the time point t4 at which the anode voltage Va(i, j) starts to increase from the OLED threshold corresponding voltage Vth_ol+ELVSS due to the turn-on of the first and second emission control transistors M5, M6 is the OLED lights-off period TLoff. In this way, the organic EL element starts to be lighted from the time point t4 when the voltage of the corresponding emission control line Ei changes to the L level and the emission period is started. (B) of FIG. 8 schematically illustrates a state of the pixel circuit Pix(i, j) in the emission period in which such a lighting operation is performed, that is, the circuit state during the lighting operation.

As described above, in each NRF frame period in the pause period TP as well, the lights-off period TLoff described above occurs for each pixel circuit 15*a*. That is, as illustrated in FIG. 5, when pause driving is performed, the lights-off period TLoff occurs in each frame period regardless of the drive period TD or the pause period TP. Therefore, according to the above improved example, the occurrence frequency of the lights-off period TLoff becomes remarkably higher than that in the above known example (FIG. 3), and the occurrence of flicker is prevented.

However, as illustrated in FIG. 6, the lights-off period TLoff in the drive period TD (RF frame period Trf) is from the time point t2 when the anode voltage Va(i, j) decreases and reaches the OLED threshold corresponding voltage Vth_ol+ELVSS to the time point t5 when the anode voltage Va(i, j) increases above the initialization voltage Vini and reaches the OLED threshold corresponding voltage Vth_ol+ELVSS, whereas as illustrated in FIG. 7, the lights-off period TLoff in the pause period TP (each NRF frame period Tnrf) is from the time point t2 when the anode voltage Va(i, j) decreases and reaches the OLED threshold corresponding voltage Vth_ol+ELVSS to the time point t4 when the anode voltage Va(i, j) starts to rise above the OLED threshold corresponding voltage Vth_ol+ELVSS (the time point when the voltage of the corresponding emission control line Ei changes to the L level). Therefore, the lights-off period TLoff in the drive period TD and the lights-off period TLoff in the pause period TP have the same start point but different end points, and the latter is shorter than the former (see FIGS. 5 to 7). As a result, in the above improved example as well, flicker is still visually recognized based on such a difference in the lights-off period, and favorable display in which flicker is sufficiently prevented cannot be performed.

<1.5 Configuration, Drive Method, and Operation of Pixel Circuit in Present Embodiment>

Next, the configuration of the pixel circuit 15 in the present embodiment, a drive method therefor, and an operation based on the drive method will be described with reference to FIGS. 9 to 13. Note that the overall configuration of the display device 10 according to the present embodiment is as described above with reference to FIG. 1.

Figure 9:
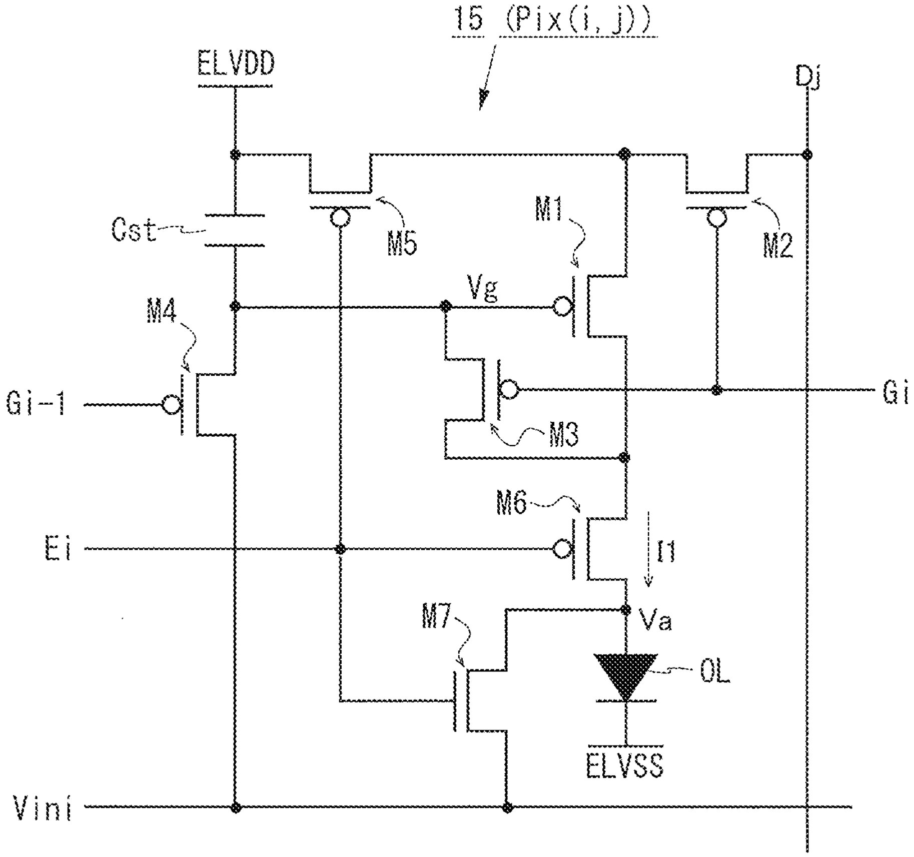
FIG. 9 is a circuit diagram illustrating a configuration of a pixel circuit in the first embodiment.

FIG. 9 is a circuit diagram illustrating the configuration of the pixel circuit 15 in the present embodiment, and more specifically, a circuit diagram illustrating the configuration of the pixel circuit 15 corresponding to the ith scanning signal line Gi and the jth data signal line Dj, that is, the pixel circuit Pix(i, j) on the ith row and jth column ($1 \le i \le n$, $1 \le j \le m$). In FIG. 9, in the configuration of the pixel circuit 15, the same or corresponding parts as those of the pixel circuit 15*a* in the known example illustrated in FIG. 2 are denoted by the same reference numerals. As can be seen by comparing FIG. 9 with FIG. 2, the pixel circuit 15 has the same configuration as the pixel circuit 15*a* in the known example except that the OLED initialization transistor M7 is of N-channel type, and the corresponding emission control line Ei is connected to the gate terminal of the OLED initialization transisitor M7, instead of the corresponding scanning signal line Gi.

FIG. 10 is a signal waveform diagram for describing the drive method in the pause drive mode according to the present embodiment and illustrates the voltage waveforms of the signal lines Gi, Ei together with waveforms of an anode voltage Va(i, j) and the emission luminance L(i, j) of the pixel circuit Pix(i, j). As can be seen by comparing FIG. 10 with FIG. 5, the scanning signal lines G0 to Gn and the emission control lines E1 to En in the present embodiment are driven in the same manner as in the above known example, and the data signal lines D1 to Dm are also driven in the same manner (the voltage waveform of the data signal line Dj is not illustrated). Therefore, during the pause period TP, the driving of each of the scanning signal lines G0 to Gn and the data signal lines D1 to Dm is stopped, and the emission control lines E1 to En are driven so as to be sequentially deactivated in each NRF frame period Tnrf (see FIG. 10).

Figure 11:
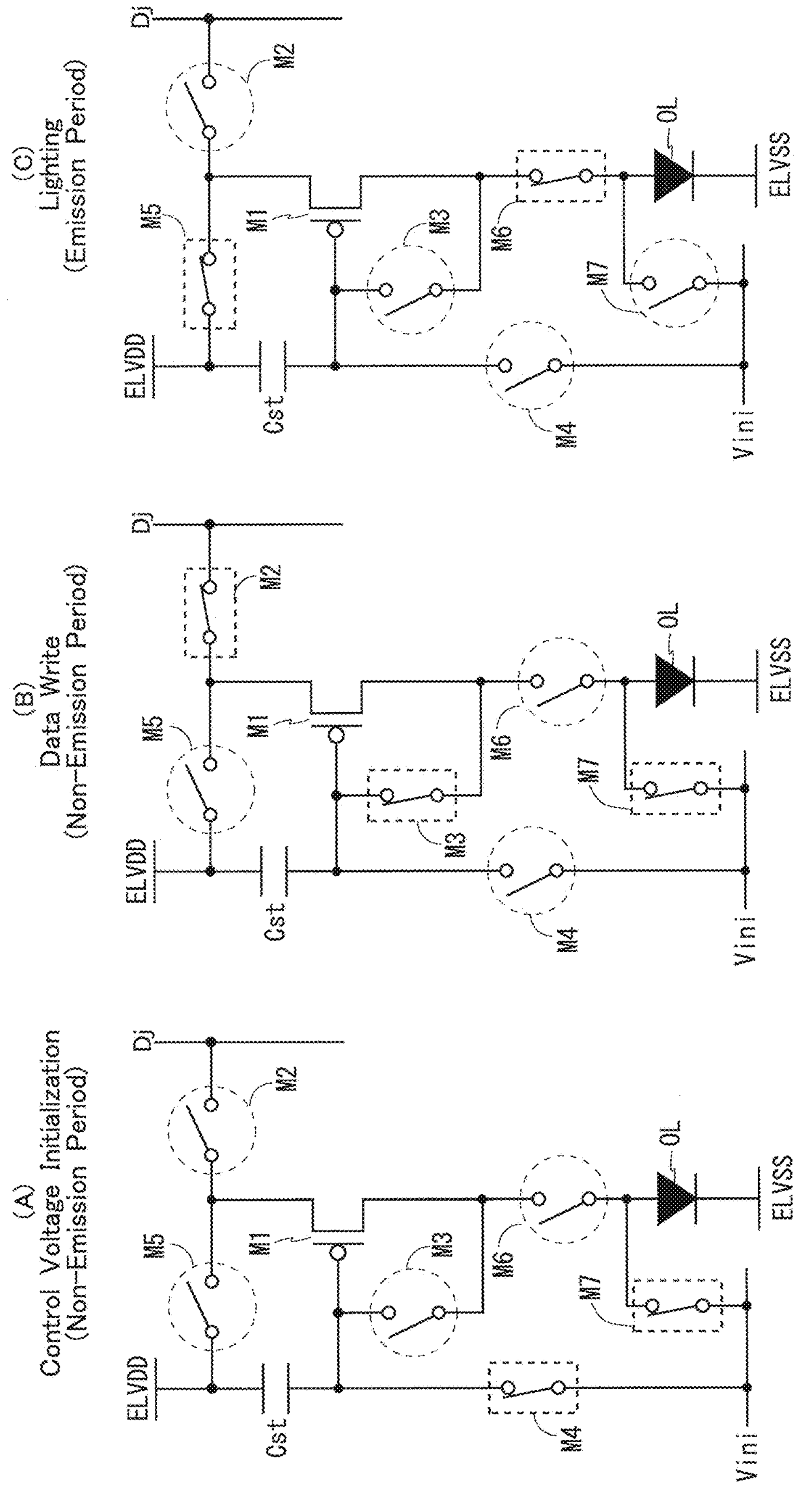
FIG. 11 provides (A) a circuit diagram for describing a control voltage initialization operation of the pixel circuit in the drive period according to the first embodiment, (B) a circuit diagram for describing a data write operation of the pixel circuit, and (C) a circuit diagram for describing a lighting operation of the pixel circuit.

FIG. 11 illustrates a state of the pixel circuit Pix(i, j) in the ith row and the jth column in the drive period TD (RF frame period Trf) when the pause driving illustrated in FIG. 10 is performed in the present embodiment. More specifically, (A) of FIG. 11 schematically illustrates a state of the pixel circuit Pix(i, j) when the voltage of the control terminal (gate terminal) of the drive transistor M1 is initialized (during the control voltage initialization operation), (B) of FIG. 11 schematically illustrates a state of the pixel circuit Pix(i, j) when the data voltage is written to the holding capacitor Cst (during the data write operation), and (C) of FIG. 11 schematically illustrates a state of the pixel circuit Pix(i, j) when the organic EL element OL is lighted (during the lighting operation). As can be seen by comparing FIG. 11 with FIG. 4, during the drive period TD (RF frame period Trf), the pixel circuit 15 (Pix(i, j)) in the present embodiment operates in the same manner as in the pixel circuit 15*a* in the above known example and improved example, except that the OLED initialization transistor M7 is in the on-state in the control voltage initialization operation as well as in the data write operation. Thus, in the present embodiment as well, the writing of the data voltage Vdata involving compensation for the threshold Vth of the drive transistor M1 is performed in the non-emission period, and the organic EL element OL in the pixel circuit Pix(i, j) emits light with luminance corresponding to the data voltage Vdata regardless of the threshold of the drive transistor M1 in the emission period (see Formulas (1) and (4) above).

Figure 12:
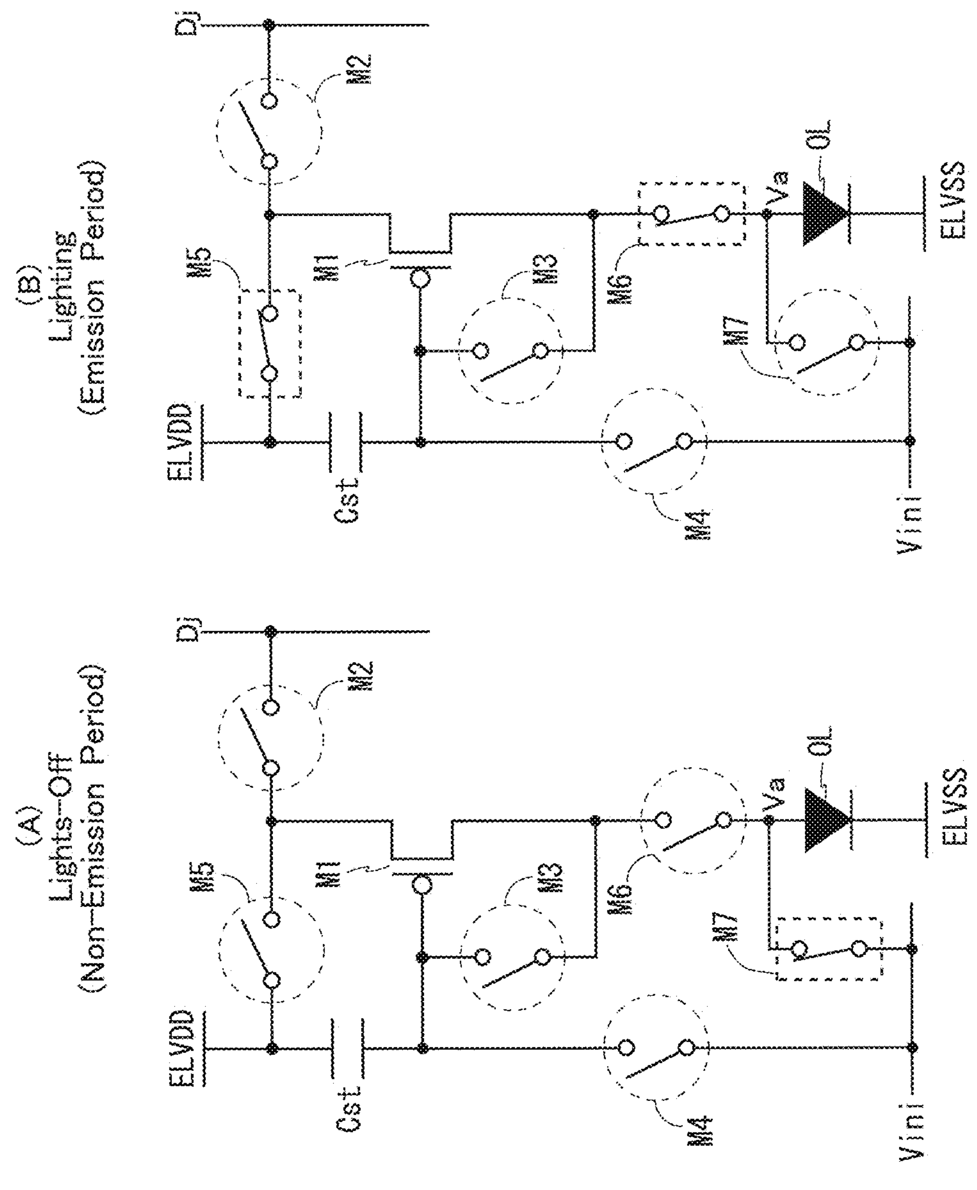
FIG. 12 provides (A) a circuit diagram for describing the lights-off operation of the pixel circuit in a pause period according to the first embodiment and (B) a circuit diagram for describing a lighting operation of the pixel circuit.

FIG. 12 illustrates a state of the pixel circuit Pix(i, j) in the ith row and the jth column in the pause period TP (each NRF frame period Tnrf) when the pause driving illustrated in FIG. 10 is performed in the present embodiment. More specifically, (A) of FIG. 12 schematically illustrates a state of the pixel circuit Pix(i, j) when the organic EL element OL is off (during the lights-off operation), and (B) of FIG. 12 schematically illustrates a state of the pixel circuit Pix(i, j) when the organic EL element OL is on (during the lighting operation). As can be seen by comparing FIG. 12 with FIG. 8, during the pause period TP (each NRF frame period Tnrf), the pixel circuit 15 (Pix(i, j)) in the present embodiment operates in the same manner as the pixel circuit 15*a* in the above improved example, except that the OLED initialization transistor M7 is in the on-state during the lights-off operation. Thus, as illustrated in FIG. 10, similarly to the above improved example, when pause driving is performed, the lights-off period TLoff occurs in each frame period regardless of the drive period TD or the pause period TP.

In the pixel circuit Pix(i, j) in the present embodiment, as illustrated in (A) of FIG. 12, the OLED initialization transistor M7 is in the on-state in the non-emission period within the pause period TP (each NRF frame period Tnrf) because, as illustrated in FIG. 9, the OLED initialization transistor M7 is of N-channel type and the corresponding emission control line Ei is connected to the gate terminal thereof. From this, in the pixel circuit Pix(i, j) in the present embodiment, the OLED initialization transistor M7 is in the on-state in the non-emission period within the drive period TD (RF frame period Trf) as well. Thereby, in the present embodiment, the lights-off period TLoff in the drive period TD (RF frame period Trf) and the lights-off period TLoff in the pause period TP (each NRF frame period Tnrf) have the same length. Hereinafter, this will be described with reference to FIG. 13.

Figure 13:
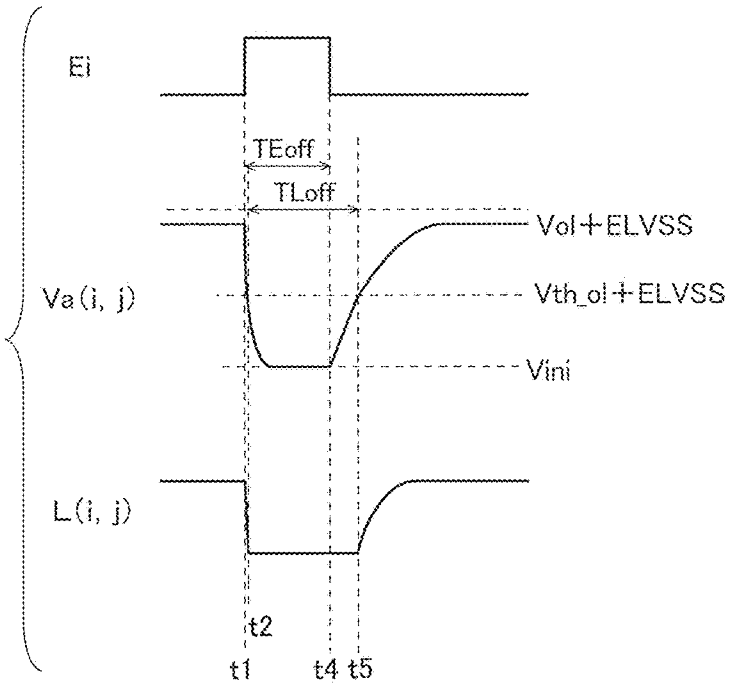
FIG. 13 is a detailed signal waveform diagram for describing a lights-off operation in a refresh frame period and a non-refresh frame period according to the first embodiment.

FIG. 13 is a detailed signal waveform diagram for describing the lights-off operation in the present embodiment. In the present embodiment, as described above, in both the drive period TD and the pause period TP (in both the RF frame period Trf and the NRF frame period Tnrf), the OLED initialization transistor M7 in the pixel circuit Pix(i, j) is in the on-state during the non-emission period, that is, during a period when the voltage of the corresponding emission control line Ei is at the H level (see (A) and (B) of FIG. 11, and (A) of FIG. 12). Therefore, regardless of the drive period TD or the pause period TP, the anode voltage Va(i, j) in the pixel circuit Pix(i, j) changes as illustrated in FIG. 13 during and immediately after the non-emission period.

That is, the voltage of the corresponding emission control line Ei of the pixel circuit Pix(i, j) changes from the L level to the H level at time t1, whereby the first and second emission control transistors M5, M6 change from the on-state to the off-state, and the N-channel OLED initialization transistor M7 changes from the off-state to the on-state. Thus, as illustrated in FIG. 13, the anode voltage Va(i, j) starts to decrease toward the initialization voltage Vini at time t1. During this decrease, when the anode voltage Va(i, j) reaches the OLED threshold corresponding voltage Vth_ol+ELVSS, the organic EL element OL comes into the lights-off state at time t2. As illustrated in (A) of FIG. 12, since the anode electrode of the organic EL element OL is connected to the initialization voltage line Vini, the anode voltage Va(i, j) decreases to the initialization voltage Vini and is thereafter maintained at the initialization voltage Vini.

Subsequently, when the voltage of the corresponding emission control line Ei changes to the L level at time t4 and the non-emission period TEoff ends, the OLED initialization transistor M7 changes to the off-state, the first and second emission control transistors M5, M6 change to the on-state, and the emission period starts. After the start time point t4 of the emission period, the drive current I1 described above flows through the drive transistor M1, and the parasitic capacitance of the organic EL element OL is charged by the drive current I1. Thereby, when the anode voltage Va(i, j) starts to rise from the initialization voltage Vini and reaches the OLED threshold-corresponding voltage Vth_ol+ELVSS at time t5, the luminance L(i, j) of the organic EL element OL starts to rise from the value at the time of lights-off (luminance 0) as illustrated in FIG. 13. That is, the organic EL element OL starts to emit light. Therefore, in each frame period, a period from the time point t2 when the anode voltage Va(i, j) decreases due to the turn-off of the first and second emission control transistors M5, M6 and the turn-on of the OLED initialization transistor M7 and reaches the OLED threshold corresponding voltage Vth_ol+ELVSS to the time point t5 when the anode voltage Va(i, j) increases from the initialization voltage Vini due to the turn-on of the first and second emission control transistors M5, M6 and the turn-off of the OLED initialization transistor M7 and reaches the OLED threshold corresponding voltage Vth_ol+ELVSS is the OLED lights-off period TLoff.

<1.6 Effects>

According to the present embodiment as described above, when pause driving is performed, in both the drive period TD and the pause period TP, the corresponding emission control line Ei of each pixel circuit Pix(i, j) is set to the H level (deactivated state) in each frame period, so that the lights-off operation of the pixel circuit Pix(i, j) is performed (see FIG. 10, (A) and (B) of FIG. 11, and (A) of FIG. 12). Therefore, in the lights-off operation in the present embodiment, regardless of the drive period TD or the pause period TP, the anode voltage Va(i, j) changes similarly, and the length of the lights-off period TLoff becomes the same (see FIGS. 10 and 13). Thereby, even when pause driving is performed, a lights-off period of the same length appears at a high frequency, and flicker is more difficult to be visually recognized, so that it is possible to perform favorable display in which flicker is prevented sufficiently.

Further, in the present embodiment, unlike the configuration described in Patent Document 2 (US 2019/0057646 A1) described above, during the pause period TP, the driving of the scanning signal lines G0 to Gn, as well as the driving of the data signal lines D1 to Dm, is completely stopped, and only the emission control lines E1 to En are driven. Thus, during the pause period TP, the power consumption of the scanning-side drive circuit 40, as well as the power consumption of the data-side drive circuit 30, is reduced sufficiently. Therefore, according to the present embodiment, it is possible to perform favorable display in which flicker is not visually recognized while the power consumption of the scanning-side drive circuit, as well as the data-side drive circuit, is sufficiently reduced when pause driving is performed. In the present embodiment, it is not necessary to increase the number of control signals and elements such as transistors in order to perform the above-described lights-off operation that brings such an effect.

2. Second Embodiment

Figure 14:
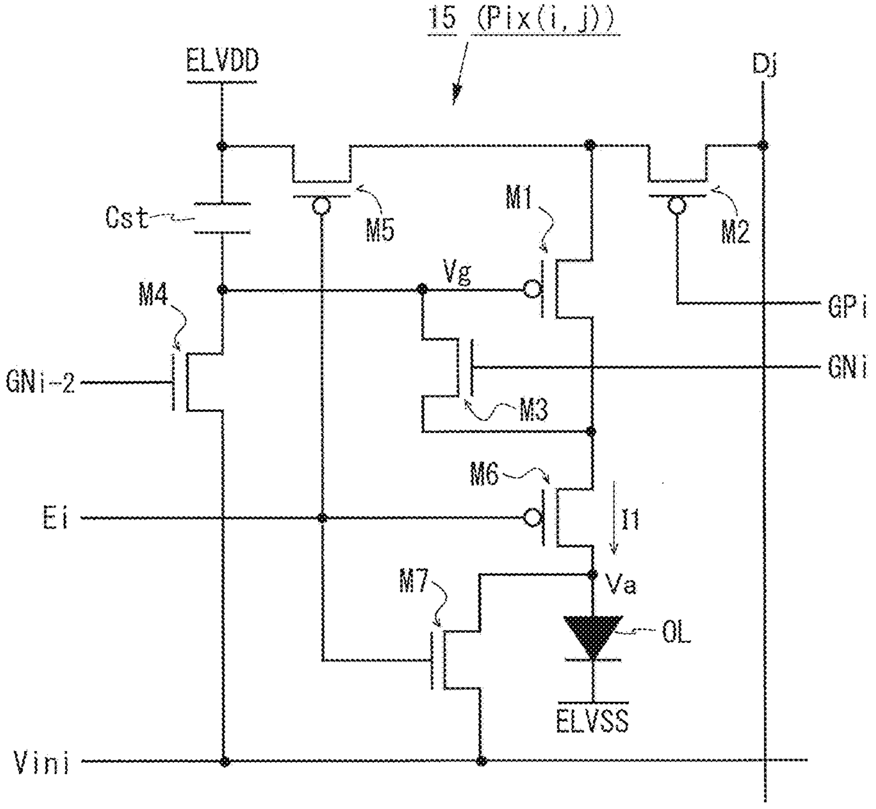
FIG. 14 is a circuit diagram illustrating a configuration of a pixel circuit in an organic EL display device according to a second embodiment.
Figure 15:
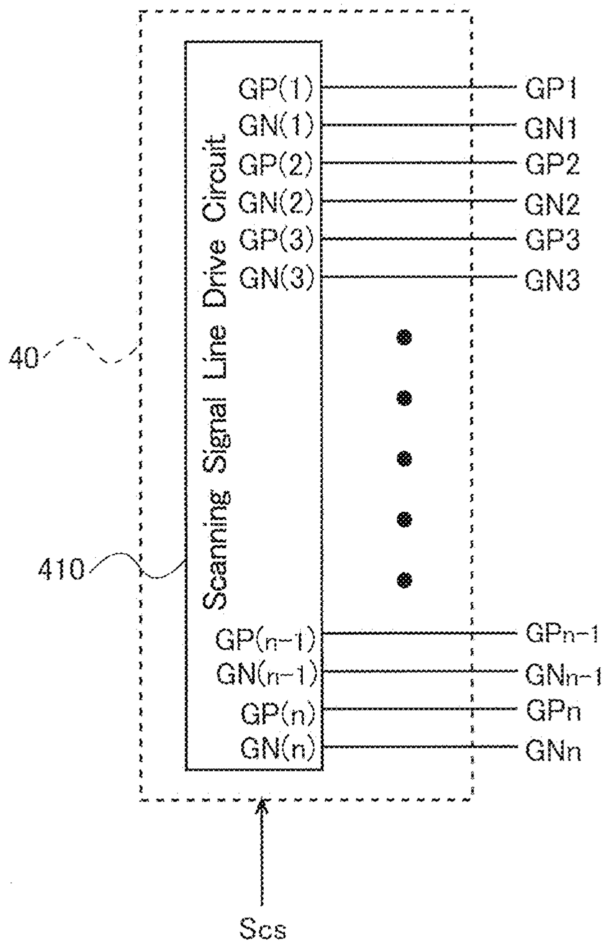
FIG. 15 is a diagram for describing a configuration for driving scanning signal lines in the second embodiment.
Figure 16:
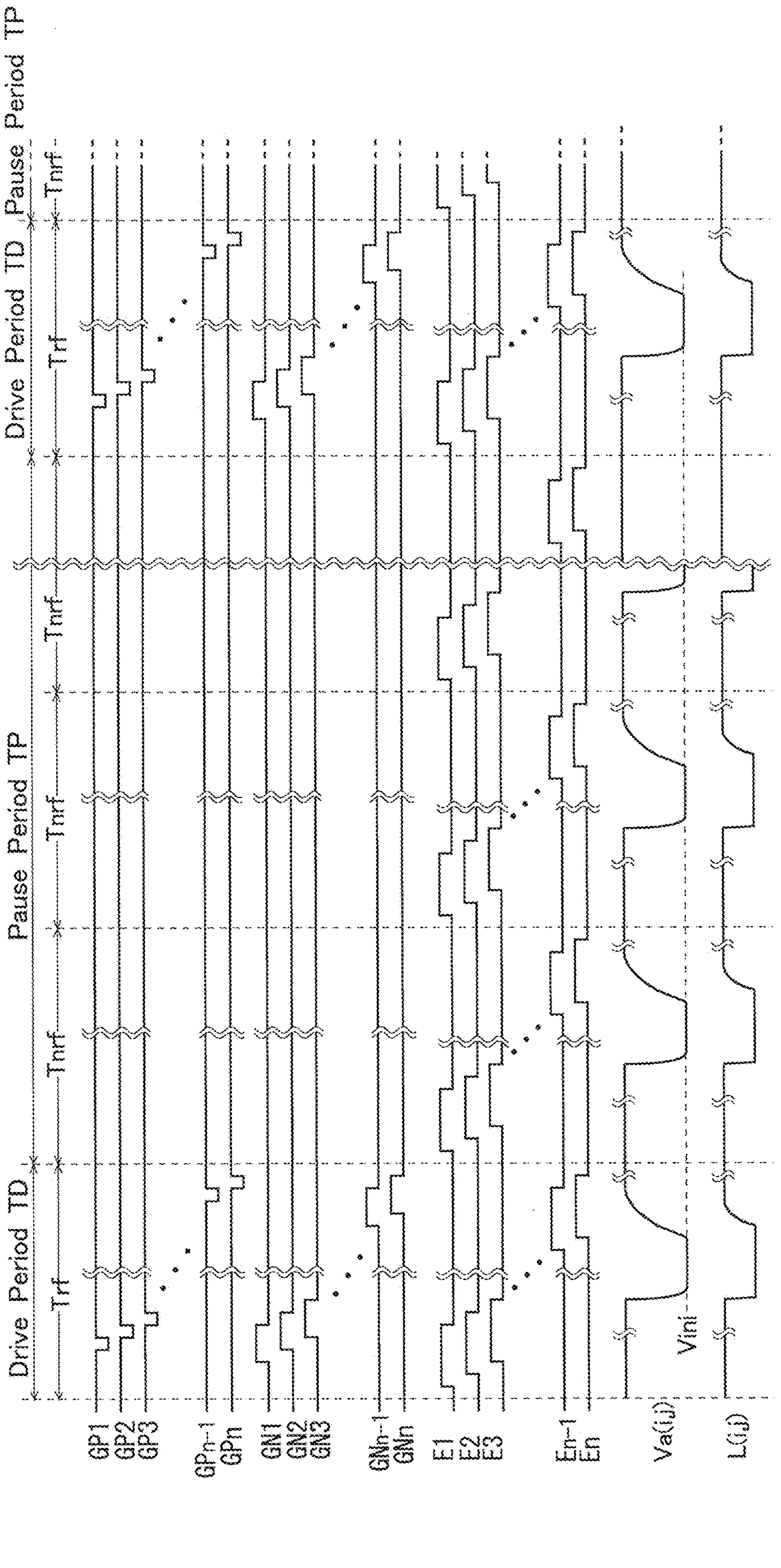
FIG. 16 is a signal waveform diagram for describing a drive method in a pause drive mode according to the second embodiment.

Next, an organic EL display device according to a second embodiment will be described with reference to FIGS. 14 to 16. FIG. 14 is a circuit diagram illustrating the configuration of the pixel circuit 15 in the present embodiment. FIG. 15 is a diagram for describing a configuration for driving a scanning signal line in the present embodiment. FIG. 16 is a signal waveform diagram for describing the drive method in the pause drive mode in the present embodiment and illustrates the voltage waveforms of the signal lines Gi, Ei together with waveforms of an anode voltage Va(i, j) and the emission luminance L(i, j) of the pixel circuit Pix(i, j). Hereinafter, in the configuration of the display device according to the present embodiment, the same or corresponding parts as those of the first embodiment (FIGS. 1 and 9) will be denoted by the same reference numerals, and a detailed description thereof will be omitted.

Similarly to the first embodiment, the display device according to the present embodiment is an organic EL display device for performing internal compensation and has two operation modes of a normal drive mode and a pause drive mode. However, in the present embodiment, the configuration of the pixel circuit 15 is different from that of the first embodiment. That is, while only the OLED initialization transistor M7 is of N-channel type in the pixel circuit 15 in the first embodiment as illustrated in FIG. 9, the threshold compensation transistor M3 and the control voltage initialization transistor M4 are also of N-channel type in addition to the OLED initialization transistor M7 in the pixel circuit 15 in the present embodiment as illustrated in FIG. 14. These N-channel transistors in the pixel circuit 15 of the present embodiment are N-channel thin-film transistors (hereinafter referred to as "oxide TFTs") in which a channel layer is formed of an oxide semiconductor, and these channel layers are formed of, for example, In—Ga—Zn—O (indium gallium zinc oxide) which is an oxide semiconductor mainly composed of indium (In), gallium (Ga), zinc (Zn), and oxygen (O). Note that the other transistors in the pixel circuit 15, that is, the drive transistor M1, the write control transistor M2, and the first and second emission control transistors M5, M6, are of P-channel type and are, for example, P-channel thin-film transistors having a channel layer formed of low-temperature polysilicon (LTPS). The configuration of the other part of the pixel circuit 15 in the present embodiment is similar to that of the first embodiment (see FIGS. 9 and 14).

Further, in the present embodiment, two types of scanning signal lines including first scanning signal lines GP1 to GPn and second scanning signal lines GN1 to GNn are provided instead of the scanning signal lines G1 to Gn in the first embodiment, corresponding to the configuration of the pixel circuit 15 described above. In the present embodiment, in order to drive these two types of scanning signal lines GP1 to GPn and GN1 to GNn, a scanning signal line drive circuit 410, which is a part in the scanning-side drive circuit 40 that drives the scanning signal lines, is configured to generate first scanning signals GP(1) to GP(n) to be applied to the first scanning signal lines GP1 to GPn and second scanning signals GN(1) to GN(n) to be applied to the second scanning signal lines GN1 to GNn based on the scanning-side control signal Scs from the display control circuit 20 as illustrated in FIG. 15 (the waveforms of the scanning signals GP(1) to GP(n) and GN(1) to GN(n), that is, the voltage waveforms of the scanning signal lines GN1 to GNn and GP1 to GPn, will be described later). Note that, for the pixel circuit Pix(1, j) (j=1 to m) in the first row, a scanning signal line (in the present embodiment, the second scanning signal line preceding the second scanning signal line GN1 in the scanning order) to be selected before the scanning signal line numbered 1 (in the present embodiment, the second scanning signal line GN1) is required for the control of the control voltage initialization transistor M4 (see FIG. 14). However, the configuration for this purpose is obvious to those skilled in the art but is not directly related to the features of the present embodiment, and thus description thereof is omitted (the same applies hereinafter).

As illustrated in FIG. 14, in the pixel circuit Pix(i, j) in the ith row and the jth column in the present embodiment, a first scanning signal line (hereinafter referred to also as a "corresponding first scanning signal line" in the description focusing on the pixel circuit) GPi corresponding to the pixel circuit Pix(i, j) is connected to the gate terminal of the write control transistor M2, a second scanning signal line (hereinafter referred to also as a "corresponding second scanning signal line" in the description focusing on the pixel circuit) GNi corresponding to the pixel circuit Pix(i, j) is connected to the gate terminal of the threshold compensation transistor M3, a second scanning signal line (hereinafter referred to also as a "further preceding second scanning signal line" in the description focusing on the pixel circuit) GNi-2 further preceding the second scanning signal line GNi-1 preceding the corresponding second scanning signal line GNi is connected to the gate terminal of the control voltage initialization transistor M4, and the corresponding emission control line Ei is connected to the gate terminals of the first and second emission control transistors M5, M6 and the OLED initialization transistor M7.

In the pause drive mode in the present embodiment, the first scanning signal lines GP1 to GPn, the second scanning signal lines GN1 to GNn, and the emission control lines E1 to En are driven as illustrated in FIG. 16. In the present embodiment, since the threshold compensation transistor M3 and the control voltage initialization transistor M4 to which the second scanning signal lines GNi, GNi-2 are respectively connected among the transistors in each pixel circuit Pix(i, j) are N-channel oxide TFTs (see FIG. 14), as illustrated in FIG. 16, the selection period (H level period) of the second scanning signal line GNi is longer than the selection period (L level period) of the first scanning signal line GPi. Accordingly, in order to perform the control voltage initialization operation, the OLED initialization operation, and the data write operation in each pixel circuit 15 in the non-emission period (see (A) and (B) of FIG. 11), the period for the deactivated state of the emission control line Ei (period for the H level) is also longer than that in the first embodiment. However, by the driving illustrated in FIG. 16, each pixel circuit Pix(i, j) operates substantially similarly to the first embodiment, and the voltage waveform in the lights-off operation of the anode voltage Va(i, j) is also similar to the first embodiment except that the lights-off period is slightly different (see voltage waveform of anode voltage Va(i, j) illustrated in FIGS. 10 and 16).

Therefore, according to the present embodiment, similarly to the first embodiment, it is possible to perform favorable display in which flicker is not visually recognized while the power consumption of the scanning-side drive circuit, as well as the data-side drive circuit, is sufficiently reduced when pause driving is performed. Moreover, in the present embodiment, since the oxide TFT is used as the threshold compensation transistor M3, the control voltage initialization transistor M4, and the OLED initialization transistor M7 in each pixel circuit Pix(i, j), the pause period TP can be lengthened and the refresh rate can be lowered while the display quality is maintained in the pause driving as compared to the first embodiment, whereby the power consumption can be further reduced.

3. Third Embodiment

Figure 17:
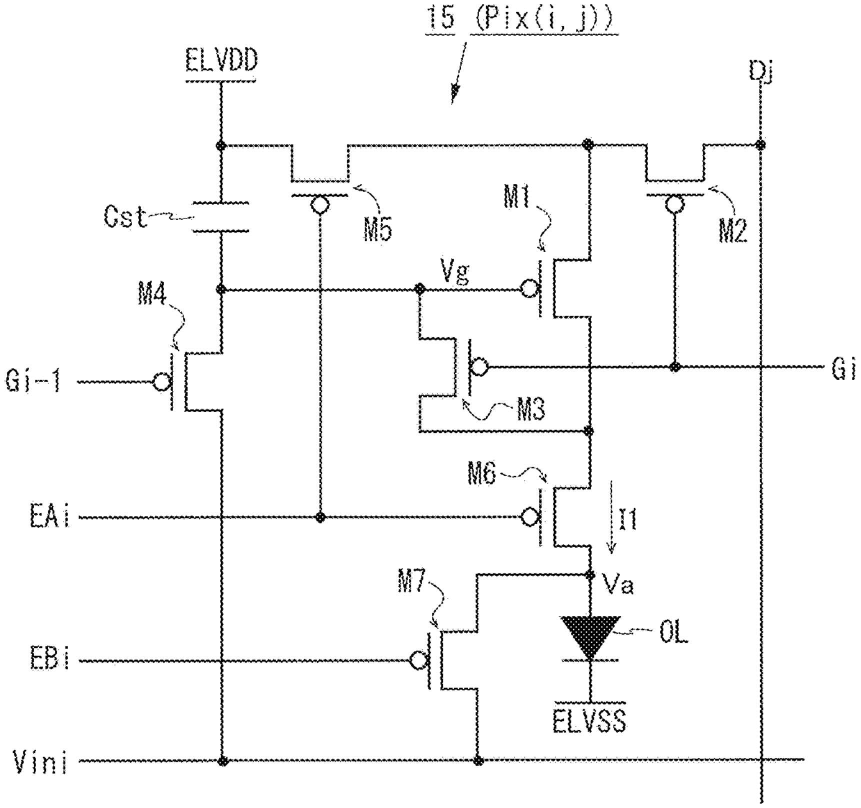
FIG. 17 is a circuit diagram illustrating a configuration of a pixel circuit in an organic EL display device according to a third embodiment.
Figure 18:
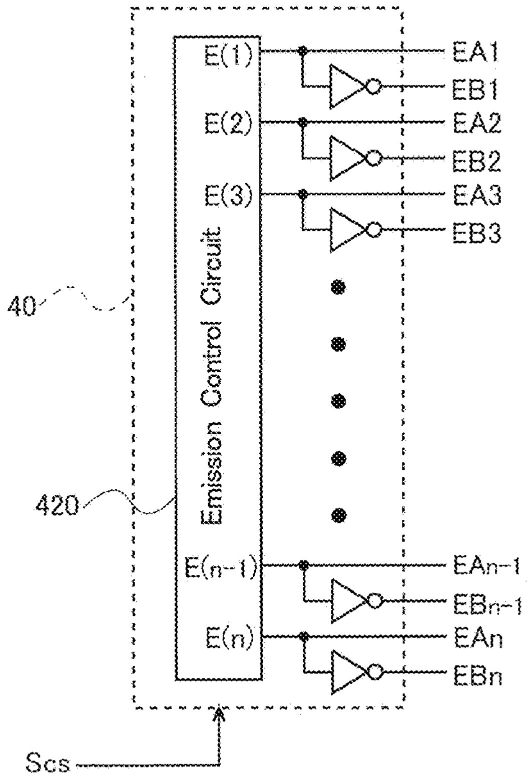
FIG. 18 is a circuit diagram illustrating a configuration example for driving an emission control line in the third embodiment.
Figure 19:
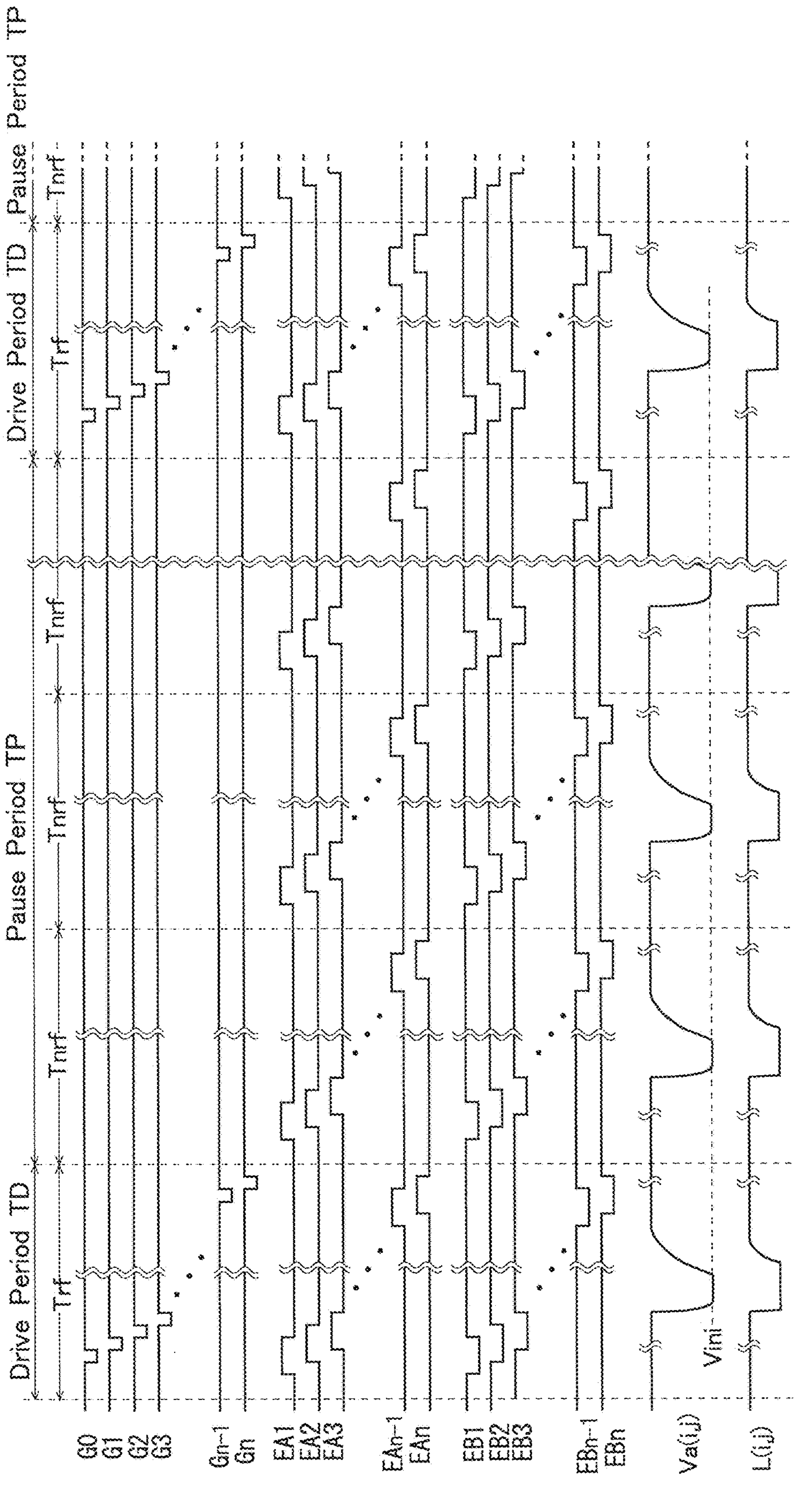
FIG. 19 is a signal waveform diagram for describing a drive method in a pause drive mode according to the third embodiment.

Next, an organic EL display device according to a third embodiment will be described with reference to FIGS. 17 to 19. FIG. 17 is a circuit diagram illustrating the configuration of the pixel circuit 15 in the present embodiment. FIG. 18 is a circuit diagram illustrating a configuration example for driving an emission control line in the present embodiment. FIG. 19 is a signal waveform diagram for describing the drive method in the pause drive mode in the present embodiment and illustrates the voltage waveforms of the signal lines Gi, Ei together with waveforms of an anode voltage Va(i, j) and the emission luminance L(i, j) of the pixel circuit Pix(i, j). Hereinafter, in the configuration of the display device according to the present embodiment, the same or corresponding parts as those of the first embodiment (FIGS. 1 and 9) will be denoted by the same reference numerals, and a detailed description thereof will be omitted.

Similarly to the first embodiment, the display device according to the present embodiment is an organic EL display device for performing internal compensation and has two operation modes of a normal drive mode and a pause drive mode. However, in the present embodiment, the configuration of the pixel circuit 15 is different from that of the first embodiment. That is, as illustrated in FIG. 9, in the pixel circuit 15 in the first embodiment, the OLED initialization transistor M7 is of N-channel type, whereas as illustrated in FIG. 17, in the pixel circuit 15 in the present embodiment, the OLED initialization transistor M7 is of P-channel type. The configuration of the other part of the pixel circuit 15 in the present embodiment is similar to that of the first embodiment.

In the present embodiment, corresponding to the above configuration of the pixel circuit 15, second emission control lines EB1 to EBn are provided in addition to the first emission control lines EA1 to EAn corresponding to the emission control lines E1 to En in the first embodiment. Further, in the present embodiment, for example, the scanning-side drive circuit 40 is configured as illustrated in FIG. 18 in order to drive these two types of emission control lines EA1 to EAn and EB1 to EBn. The scanning-side drive circuit 40 includes an emission control circuit 420 that generates first emission control signals E(1) to E(n) to be applied to the first emission control lines EA1 to EAn, respectively, based on the scanning-side control signal Scs from the display control circuit 20, and generates a second emission control signal by logically inverting the first emission control signals E(1) to E(n), respectively. In the example of FIG. 18, the scanning-side drive circuit 40 includes n inverters that logically invert the first emission control signals E(1) to E(n) generated by the emission control circuit 420. With such a configuration, the first emission control signals E(1) to E(n) are respectively applied to the first emission control lines EA1 to EAn, and signals obtained by logically inverting the first emission control signals E(1) to E(n) are respectively applied to the second emission control lines EB1 to EBn as second emission control signals.

As illustrated in FIG. 17, in the pixel circuit Pix(i, j) in the ith row and the jth column in the present embodiment, similarly to the first embodiment, the corresponding scanning signal line Gi is connected to the gate terminals of the write control transistor M2 and the threshold compensation transistor M3, and the preceding scanning signal line Gi-1 is connected to the gate terminal of the control voltage initialization transistor M4. In addition, a first emission control line EAi to which the same first emission control signal E(i) as the signal applied to the corresponding emission control line Ei in the first embodiment is applied is connected to the gate terminals of the first and second emission control transistors M5, M6. However, unlike the first embodiment, since the OLED initialization transistor M7 is of P-channel type, the second emission control line to which the logically inverted signal of the first emission control signal E(i) is applied is connected to the gate terminal of the OLED initialization transistor M7.

In the pause drive mode in the present embodiment, the scanning signal lines G0 to Gn, the first emission control lines EA1 to EAn, and the second emission control lines EB1 to EBn are driven as illustrated in FIG. 19. In the present embodiment, since the OLED initialization transistor M7 in each pixel circuit Pix(i, j) is of P-channel type, the first emission control lines EA1 to EAn and the second emission control lines EB1 to EBn are provided as described above, and the logically inverted signal of the first emission control signal E(i) is applied to the gate terminal of the OLED initialization transistor M7 via the second emission control line EBi. However, each pixel circuit Pix(i, j) operates in the same manner as in the first embodiment by the driving illustrated in FIG. 19, and the voltage waveform in the lights-off operation of the anode voltage Va(i, j) is also similar to that in the first embodiment (see the voltage waveform of the anode voltage Va(i, j) illustrated in FIGS. 10 and 19).

Therefore, according to the present embodiment, two types of emission control lines (two types of emission control signals) are required, but in the organic EL display device that achieves similar effects to those of the first embodiment, the pixel circuit is configured using only the P-channel transistor. Hence the present embodiment is more advantageous than the first embodiment in terms of manufacturing the pixel circuit. Note that similar effects to those of the present embodiment can also be obtained by forming the pixel circuit using only the N-channel transistor and providing the two types of emission control lines as described above (details will be described later as a modification).

4. Fourth Embodiment

Next, an organic EL display device according to a fourth embodiment will be described with reference to FIGS. 20 to 23.

Figure 20:
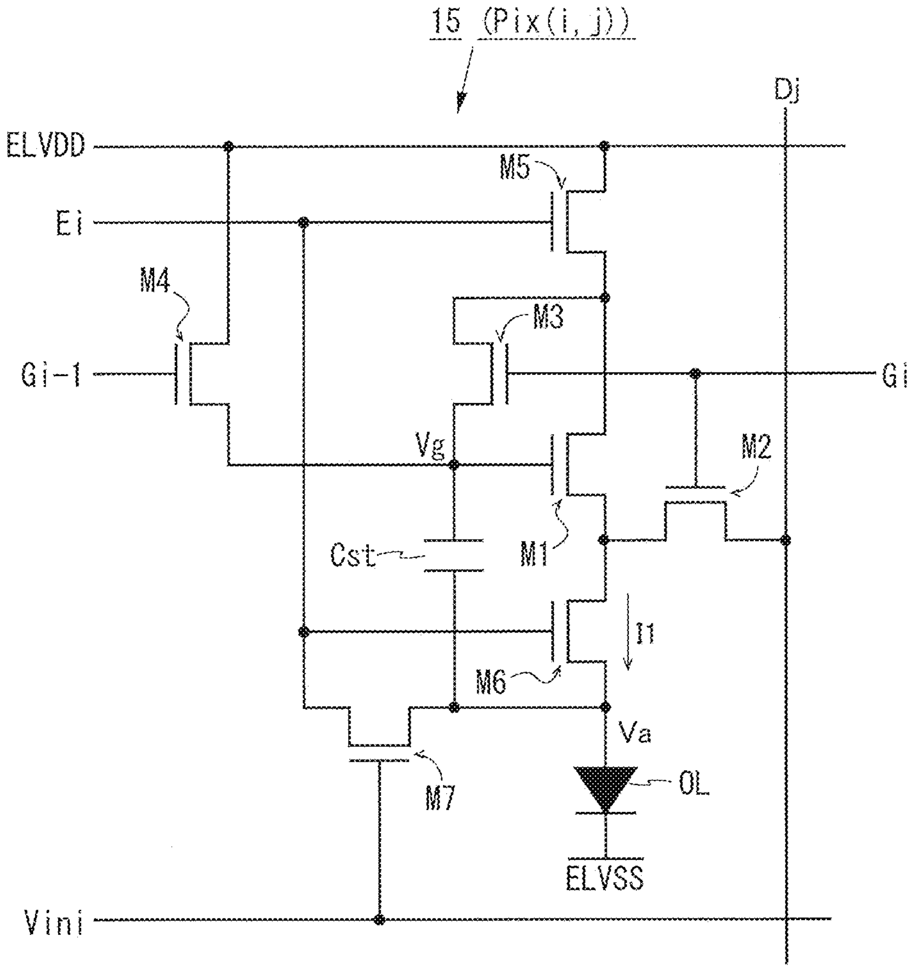
FIG. 20 is a circuit diagram illustrating a configuration of a pixel circuit in an organic EL display device according to a fourth embodiment.
Figure 21:
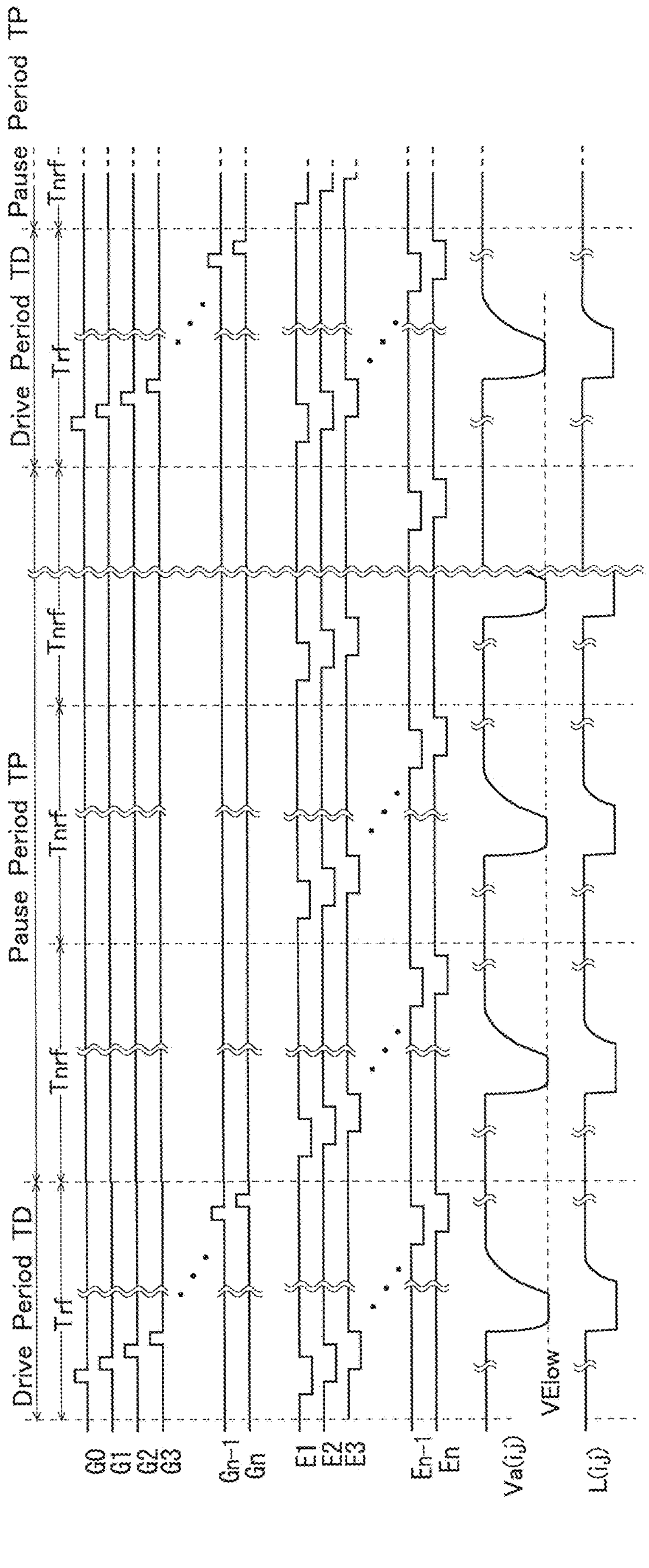
FIG. 21 is a signal waveform diagram for describing a drive method in a pause drive mode according to the fourth embodiment.
Figure 22:
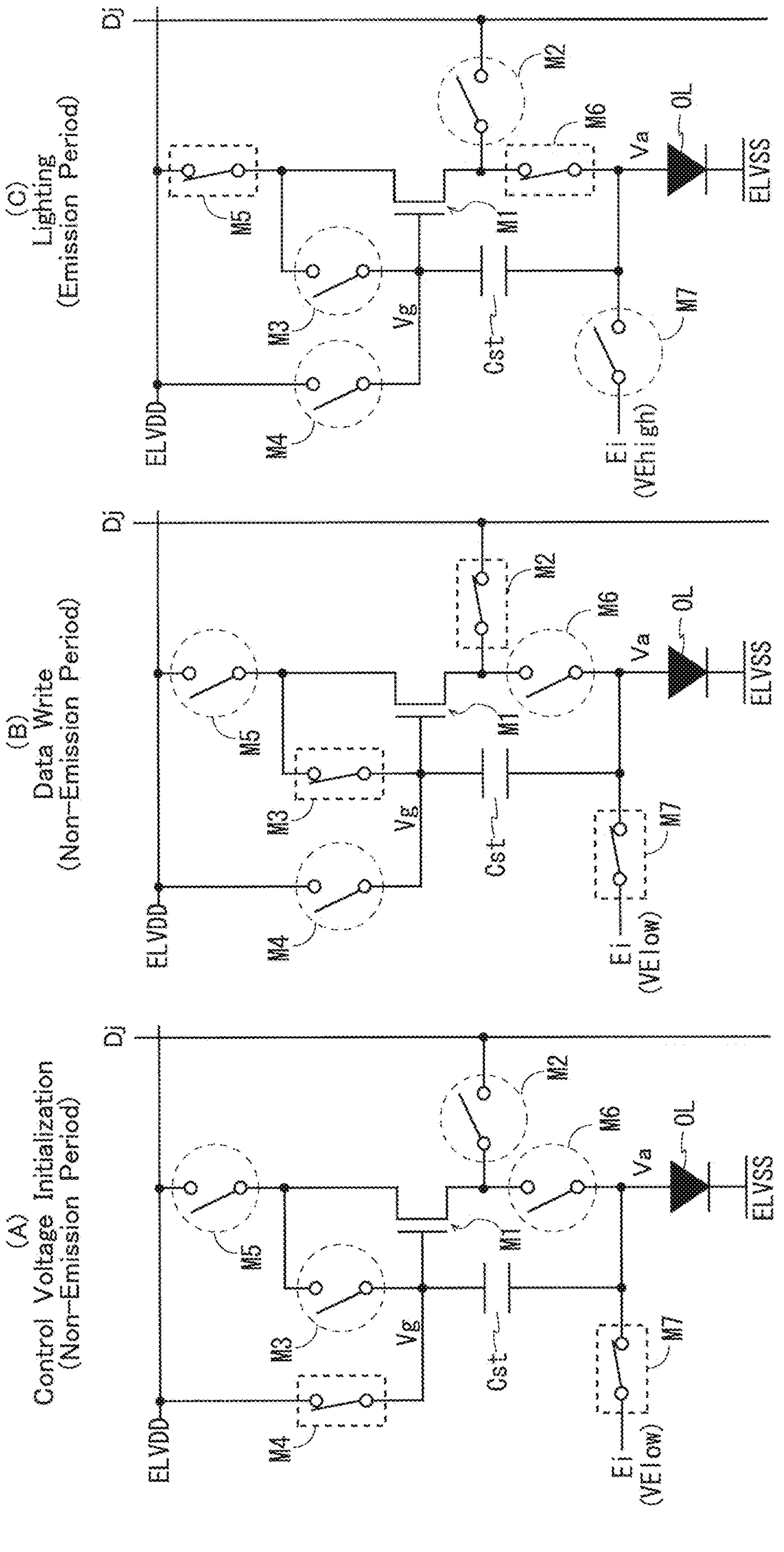
FIG. 22 provides (A) a circuit diagram for describing a control voltage initialization operation of the pixel circuit in the drive period according to the fourth embodiment, (B) a circuit diagram for describing a data write operation of the pixel circuit, and (C) a circuit diagram for describing a lighting operation of the pixel circuit.
Figure 23:
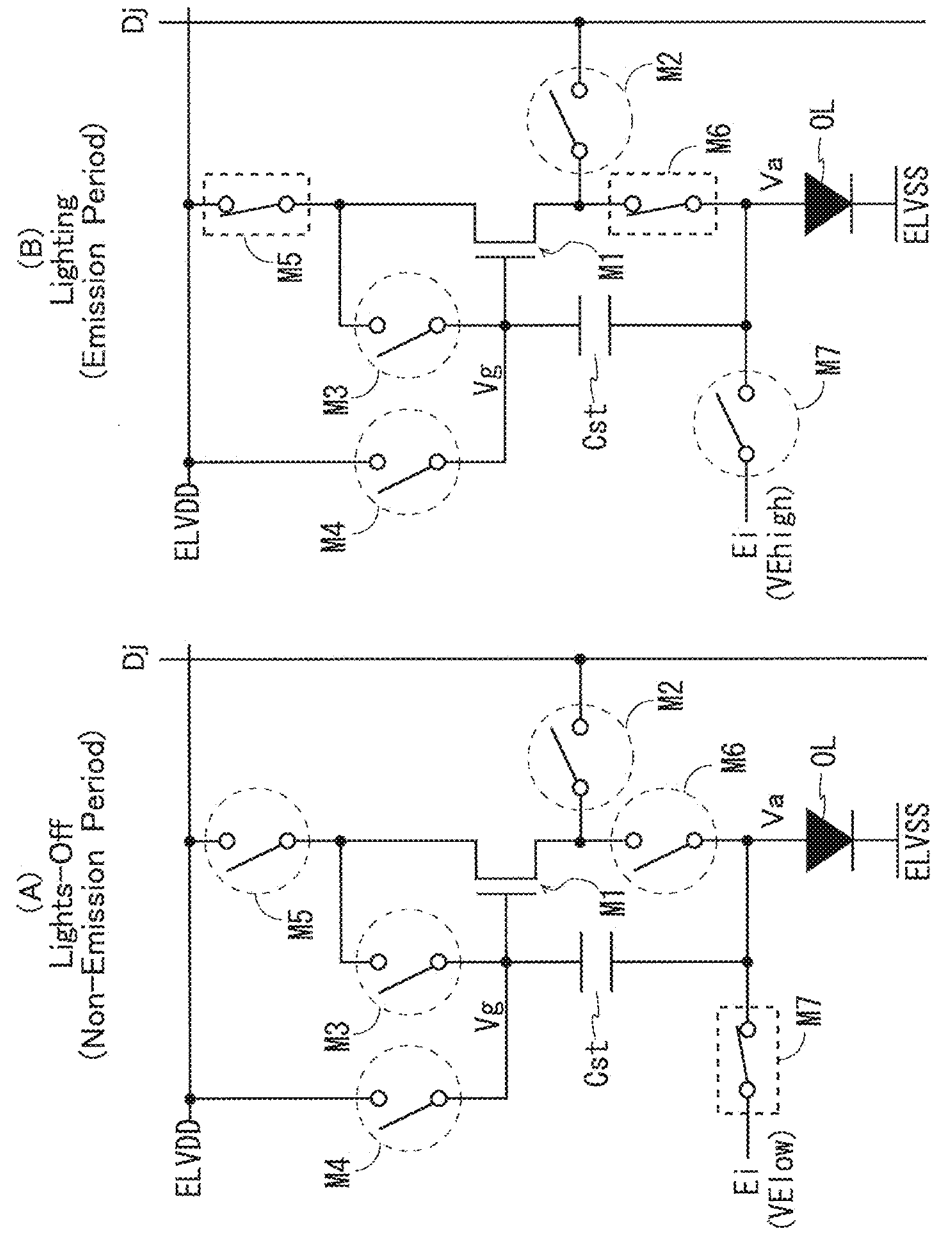
FIG. 23 provides (A) a circuit diagram for describing the lights-off operation of the pixel circuit in a pause period according to the fourth embodiment and (B) a circuit diagram for describing a lighting operation of the pixel circuit.

FIG. 20 is a circuit diagram illustrating the configuration of the pixel circuit 15 in the present embodiment. FIG. 21 is a signal waveform diagram for describing the drive method in the pause drive mode in the present embodiment and illustrates the voltage waveforms of the signal lines Gi, Ei together with waveforms of an anode voltage Va(i, j) and the emission luminance L(i, j) of the pixel circuit Pix(i, j). FIG. 22 illustrates a state of the pixel circuit Pix(i, j) in the ith row and the jth column in the drive period TD (RF frame period Trf) when the pause driving illustrated in FIG. 21 is performed in the present embodiment. More specifically, (A) of FIG. 22 schematically illustrates a state of the pixel circuit Pix(i, j) during the control voltage initialization operation, (B) of FIG. 22 schematically illustrates a state of the pixel circuit Pix(i, j) during the data write operation, and (C) of FIG. 22 schematically illustrates a state of the pixel circuit Pix(i, j) during the lighting operation. FIG. 23 illustrates a state of the pixel circuit Pix(i, j) in the ith row and the jth column in the pause period TP (each NRF frame period Tnrf) when the pause driving illustrated in FIG. 21 is performed in the present embodiment. More specifically, (A) of FIG. 23 schematically illustrates a state of the pixel circuit Pix(i, j) during the lights-off operation, and (B) of FIG. 23 schematically illustrates a state of the pixel circuit Pix(i, j) during the lighting operation. Hereinafter, in the configuration of the display device according to the present embodiment, the same or corresponding parts as those of the first embodiment (FIGS. 1 and 9) will be denoted by the same reference numerals, and a detailed description thereof will be omitted.

Similarly to the first embodiment, the display device according to the present embodiment is an organic EL display device for performing internal compensation and has two operation modes of a normal drive mode and a pause drive mode. In addition, similarly to the first embodiment, the data signal lines D1 to Dm, the scanning signal lines G0 to Gn, and the emission control lines E1 to En are provided, and a connection relationship between each of these signal lines and each pixel circuit Pix(i, j) is also similar to that of the first embodiment (see FIG. 1).

However, the pixel circuit 15 in the present embodiment is different from the pixel circuit 15 (FIG. 9) in the first embodiment and is configured as illustrated in FIG. 20. FIG. 20 illustrates the configuration of the pixel circuits 15 corresponding to the ith scanning signal line Gi and the jth data signal line Dj, that is, the pixel circuit Pix(i, j) on the ith row and the jth column in the present embodiment ($1 \leq i \leq n$ and $1 \leq j \leq m$). Similarly to the first embodiment, the pixel circuit 15 includes an organic EL element OL as a display element, a drive transistor M1, a holding capacitor Cst, a write control transistor M2, a threshold compensation transistor M3, a control voltage initialization transistor M4, a first emission control transistor M5, a second emission control transistor M6, and an OLED initialization transistor M7. However, all these transistors M1 to M7 are of N-channel type, and the connection configuration in the pixel circuit 15 is also different from that of the first embodiment. As the transistors M1 to M7, N-channel oxide TFTs are preferably used, but the transistors are not limited thereto.

As illustrated in FIG. 20, in the pixel circuit 15, the drain terminal as the first conductive terminal of the drive transistor M1 is connected to the high-level power line ELVDD via the first emission control transistor M5. The source terminal as the second conductive terminal of the drive transistor M1 is connected to the corresponding data signal line Dj via the write control transistor M2 and is connected to the anode electrode of the organic EL element OL via the second emission control transistor M6. The gate terminal as a control terminal of the drive transistor M1 is connected to the anode electrode of the organic EL element OL via the holding capacitor Cst, is connected to the drain terminal of the drive transistor M1 via the threshold compensation transistor M3, and is connected to the high-level power line ELVDD via the control voltage initialization transistor M4. The anode electrode of the organic EL element OL is connected to the corresponding emission control line Ei via the OLED initialization transistor M7, and the cathode electrode of the organic EL element OL is connected to the low-level power line ELVSS. The gate terminals of the write control transistor M2 and the threshold compensation transistor M3 are connected to the corresponding scanning signal line Gi, the gate terminals of the first and second emission control transistors M5, M6 are connected to the corresponding emission control line Ei, the gate terminal of the control voltage initialization transistor M4 is connected to the preceding scanning signal line Gi-1, and the gate terminal of the OLED initialization transistor M7 is connected to the initialization voltage line Vini. As described later, the voltage of the initialization voltage line Vini is not an initialization voltage to be given to the organic EL element OL for initialization but is used to control on/off of the OLED initialization transistor M7 by a voltage corresponding to a difference between the voltage of the initialization voltage line Vini and the voltage of the corresponding emission control line Ei.

In the pause drive mode in the present embodiment, the scanning signal lines G0 to Gn and the emission control lines E1 to En are driven as illustrated in FIG. 21. In the first embodiment (see FIG. 10), the scanning signal lines G0 to Gn and the emission control lines E1 to En are driven by a negative logic voltage signal since all the transistors except for the OLED initialization transistor M7 are of P-channel type in each pixel circuit Pix(i, j), but in the present embodiment (see FIG. 21), those lines are driven by a positive logic voltage signal since the write control transistor M2, the threshold compensation transistor M3, the first and second emission control transistors M5, M6, and the control voltage initialization transistor M4 are of N-channel type in each pixel circuit Pix(i, j). However, as can be seen by comparing FIG. 21 with FIG. 10 in consideration of this point, the drive method in the pause drive mode in the present embodiment is substantially the same as the drive method in the pause drive mode in the first embodiment.

In the first embodiment, on/off of the N-channel OLED initialization transistor M7 in the pixel circuit Pix(i, j) is controlled by the voltage of the emission control line Ei as the negative logic voltage signal (voltage signal that becomes the H level in the non-emission period) (see FIGS. 9 and 10), whereas in the present embodiment, the voltage of the emission control line Ei as the negative logic voltage signal is not required for on/off of the N-channel OLED initialization transistor M7 in the pixel circuit Pix(i, j), and on/off of the OLED initialization transistor M7 is controlled by the voltage corresponding to the difference between the voltage of the initialization voltage line Vini and the voltage of the corresponding emission control line Ei. Therefore, in the pixel circuit Pix(i, j) in the present embodiment, as illustrated in FIG. 20, the OLED initialization transistor M7 having a drain terminal connected to the anode electrode of the organic EL element OL has a source terminal connected to the corresponding emission control line Ei and a gate terminal connected to the initialization voltage line Vini as a low-voltage-side voltage line. Here, assuming that the L-level voltage and the H-level voltage of each emission control line Ei (i=1 to n) are denoted by reference numerals "VElow" and "VEhigh", respectively, and the voltage of the initialization voltage line Vini is denoted by the same reference numeral "Vini", Formula (5) below needs to be satisfied in order to turn on the OLED initialization transistor M7 in the non-emission period, and Formula (6) below needs to be satisfied in order to turn off the OLED initialization transistor M7 in the emission period (see FIG. 20). However, it is assumed that VEhigh>Vini, and the voltage drop due to the internal resistance of the organic EL element OL is ignored.

$$Vini-VElow>Vth \tag{5}$$

$$Vini-Va=Vini-(Vth\_ol+ELVSS)<Vth \tag{6}$$

In the above, Vth is a threshold of the OLED initialization transistor M7, and Vth_ol is a threshold (OLED threshold voltage) of the organic EL element OL. The following formula is obtained from Formulas (5) and (6) above.

$$VElow+Vth<Vini<Vth+Vth\_ol+ELVSS \tag{7}$$

Therefore, in the present embodiment, the L-level voltage VElow of each emission control line Ei and the voltage Vini of the initialization voltage line (low-voltage-side voltage line) are determined in advance so as to satisfy Formula (7) above.

Hereinafter, the operation of the pixel circuit Pix(i, j) in the ith row and the jth column in the pause drive mode in the present embodiment configured as described above will be described. First, the operation of the pixel circuit Pix(i, j) in the drive period TD (RF frame period Trf) will be described with reference to FIG. 21 and FIG. 22.

In a period (selection period) during which the preceding scanning signal line Gi-1 is at the H level in the non-emission period during which the voltage of the corresponding emission control line Ei is at the L level, the pixel circuit Pix(i, j) is in the state illustrated in (A) of FIG. 22. As illustrated in (A) of FIG. 22, in this selection period, the control voltage initialization transistor M4 is in the on-state. In the selection period, the voltage applied between the gate and source terminals of the OLED initialization transistor M7 is Vini−VElow, so that the OLED initialization transistor M7 is also in the on-state from Formula (5) above. Therefore, the holding capacitor Cst is initialized by being charged via the control voltage initialization transistor M4 and the OLED initialization transistor M7 (this means the initialization of the gate voltage Vg of the drive transistor M1). In the non-emission period, the L-level voltage VElow of the corresponding emission control line Ei is applied to the anode electrode of the organic EL element OL via the OLED initialization transistor M7, whereby the organic EL element OL is initialized. As described above, in the present embodiment, the L-level voltage VElow of the corresponding emission control line Ei is used as the initialization voltage of the organic EL element OL.

Thereafter, in the non-emission period, the voltage of the preceding scanning signal line Gi-1 changes to the L level to terminate the selection period for the preceding scanning signal line Gi-1, and the voltage of the corresponding scanning signal line Gi changes from the L level to the H level to set the period as the selection period for the corresponding scanning signal line Gi. As illustrated in (B) of FIG. 22, in this period, the control voltage initialization transistor M4 is in the off-state, but the OLED initialization transistor M7 is still in the on-state, and in addition, the write control transistor M2 and the threshold compensation transistor M3 are also in the on-state. Thereby, similarly to the first embodiment (see (B) of FIG. 11), writing of the data voltage Vdata accompanied by compensation for the threshold Vth of the drive transistor M1 is performed. As a result, in the subsequent emission period, the organic EL element OL in the pixel circuit Pix(i, j) emits light with luminance corresponding to the data voltage Vdata regardless of the threshold of the drive transistor M1 (see (C) in FIG. 22).

When the voltage of the corresponding emission control line Ei changes to the H level after the above data write operation, an emission period is set. As illustrated in (C) of FIG. 22, in the emission period, the voltage applied between the gate and source terminals of the OLED initialization transistor M7 is Vini−VEhigh, so that the OLED initialization transistor M7 is in the off-state from Formula (5) above. Further, in the emission period, the first and second emission control transistors M5, M6 are in the on-state. Therefore, similarly to the first embodiment (see (C) of FIG. 11), a current I1 flows from the high-level power line ELVDD to the low-level power line ELVSS via the first emission control transistor M5, the drive transistor M1, the second emission control transistor M6, and the organic EL element OL. As a result, the organic EL element OL emits light with luminance corresponding to the data voltage Vdata that is the voltage of the corresponding data signal line Dj in the selection period for the corresponding scanning signal line Gi.

Next, the operation of the pixel circuit Pix(i, j) in the ith row and the jth column in the pause period TP (each NRF frame period Tnrf) in the present embodiment will be described with reference to FIG. 21 and FIG. 23.

In the pixel circuit Pix(i, j), as illustrated in (A) of FIG. 23, when the non-emission period is started in the pause period TP (each NRF frame period Tnrf), the OLED initialization transistor M7 is turned on by a change in the corresponding emission control line Ei from the H level to the L level as in the case where the non-emission period is started in the drive period TD (see FIG. 21 and (A) of FIG. 22). As illustrated in (B) of FIG. 23, also, when the non-emission period ends and the emission period starts in the pause period TP, the OLED initialization transistor M7 is turned off by a change in the corresponding emission control line Ei from the L level to the H level as in the case where the non-emission period ends and the emission period starts in the drive period TD (see FIG. 21 and (C) of FIG. 22). Therefore, in the present embodiment, similarly to the first embodiment (see FIG. 13), regardless of the drive period TD or the pause period TP, the anode voltage Va(i, j) in the pixel circuit Pix(i, j) changes similarly in and immediately after the non-emission period. Thereby, the waveform of the emission luminance L(i, j) in the lights-off operation has the same shape regardless of the drive period TD or the pause period TP, and the lights-off period in each frame period has the same length. Therefore, similarly to the first embodiment, when pause driving is performed, it is possible to perform favorable display in which flicker is sufficiently prevented while the power consumption of the scanning-side drive circuit, as well as the data-side drive circuit, is sufficiently reduced when pause driving is performed.

In the present embodiment, as illustrated in FIG. 20, the pixel circuit Pix(i, j) is configured using only the N-channel transistor without increasing the number of types of emission control lines as in the third embodiment (FIGS. 17 to 19). Moreover, by using the oxide TFT as each of the N-channel transistors M1 to M7 used in the pixel circuit Pix(i, j), a leakage current from a node including the gate terminal of the drive transistor M1 can be prevented. Therefore, it is possible to improve display quality when pause driving is performed, and it is possible to further reduce power consumption by increasing the pause period TP and decreasing the refresh rate while maintaining the display quality.

<5. Modifications>

The disclosure is not limited to each of the above embodiments, and various modifications can be made so long as not deviating from the scope of the disclosure.

For example, in each of the above embodiments, the pixel circuit 15 is configured based on the pixel circuit of the internal compensation system illustrated in FIG. 2, but the pixel circuit 15 is not limited to the pixel circuit of the internal compensation system having such a configuration. The disclosure can be applied to any pixel circuit configured to initialize the display element such as the organic EL element OL in order to block the influence of the past display history and prevent deterioration in display quality.

In the pixel circuit 15 in each of the above embodiments, the OLED initialization transistor M7 is connected as illustrated in FIG. 9, FIG. 14, FIG. 17, or FIG. 20, whereby the circuit (hereinafter referred to as an "initialization circuit") for initializing the organic EL element OL is configured. However, the initialization circuit is not limited to such a configuration but may be configured such that a voltage for initializing the organic EL element OL is applied to the organic EL element OL via a switching element (a switching element corresponding to the OLED initialization transistor M7) controlled based on the voltage of the corresponding emission control line Ei when the voltage of the corresponding emission control line Ei is at a level for turning off the first and second emission control transistors M5, M6.

Both the P-channel transistor and the N-channel transistor are used in the pixel circuit 15 in the first and second embodiments, only the P-channel transistor is used in the pixel circuit 15 in the third embodiment, and only the N-channel transistor is used in the pixel circuit 15 in the fourth embodiment. However, the connection relationship in the pixel circuit 15 may be reconfigured appropriately by replacing the P-channel type with the N-channel type or the N-channel type with the P-channel type for each transistor in the pixel circuit 15 in each embodiment without departing from the gist of the disclosure. For example, in the third embodiment, in the pixel circuit 15 illustrated in FIG. 17, the transistors M1 to M7 may be replaced from the P-channel type to the N-channel type to reconfigure the connection relationship to be as illustrated in FIG. 20 except for the OLED initialization transistor M7. In this case, the drain terminal of the OLED initialization transistor M7 is connected to the anode electrode of the organic EL element OL, the source terminal thereof is connected to the initialization voltage line Vini, and the gate terminal thereof is connected to the emission control line Ei that transmits a logically inverted signal of a voltage signal having a waveform illustrated in FIG. 21. Further, in the pixel circuit having such a configuration, only the OLED initialization transistor M7 may be switched from the N-channel type to the P-channel type. In this case, the emission control line Ei that transmits the voltage signal having the waveform illustrated in FIG. 21 is connected to the gate terminal of the P-channel OLED initialization transistor M7. The pixel circuit obtained as a result corresponds to a pixel circuit obtained by replacing the P-channel type with the N-channel type or the N-channel type with the P-channel type for each of the transistors M1 to M7 in the pixel circuit 15 in the first embodiment illustrated in FIG. 9 to appropriately reconfigure the connection relationship.

Figure 24:
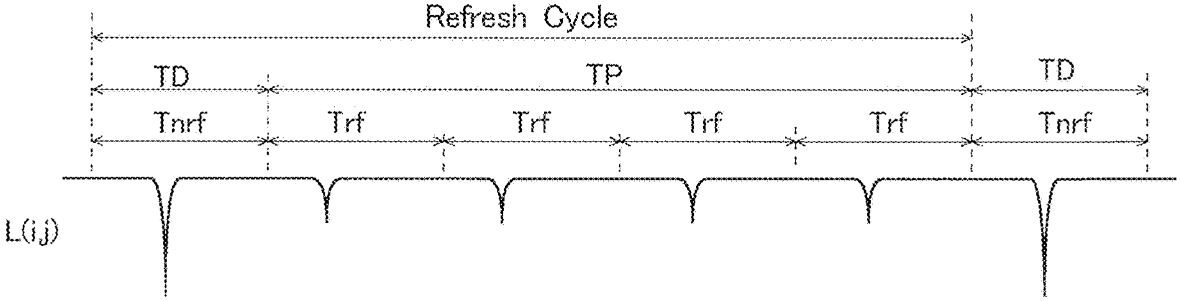
FIG. 24 is a waveform chart for describing a lights-off operation in another mode of the improved example.
Figure 25:
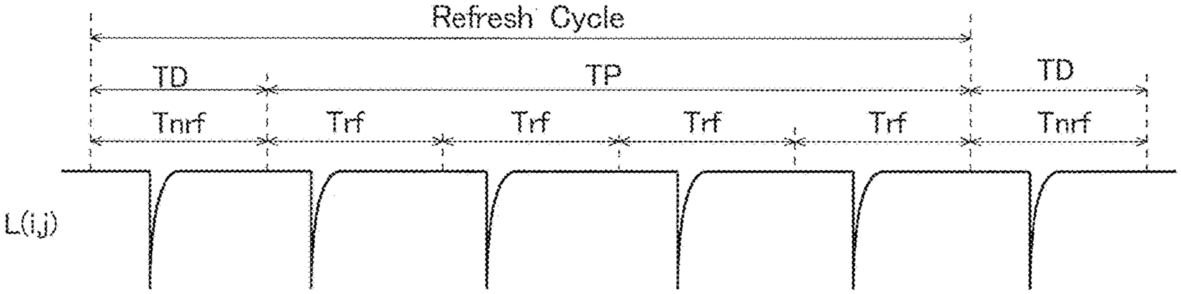
FIG. 25 is a waveform chart for describing a lights-off operation in a modification of each of the above embodiments.

In the above improved example, as described above, the flicker is still visually recognized because the length of the lights-off period TLoff caused by the lights-off operation in the non-emission period TEoff is different between the drive period TD and the pause period TP (see FIGS. 5 to 7). However, in the above improved example, when the length of the non-emission period TEoff is shorter than that illustrated in FIGS. 6 and 7, the organic EL element OL may not be completely turned off in the lights-off operation in the pause period TP (NRF frame period Tnrf). In this case, as illustrated in FIG. 24, the degree of the luminance decrease due to the lights-off operation is different between the drive period TD and the pause period TP, whereby the flicker is still visually recognized. However, even in such a case, according to each of the above embodiments, the waveform of the anode voltage Va(i, j) in the lights-off operation has the same shape in the drive period TD and the pause period TP, and as a result, as illustrated in FIG. 25, the degree of luminance reduction and the luminance waveform due to the lights-off operation are the same in the drive period TD and the pause period TP.

In the above, the embodiments and the modifications thereof have been described by taking the organic EL display device as an example, but the disclosure is not limited to the organic EL display device and may be applied to any display device using a display element that is driven by a current. Examples of the display element that can be used here include an organic EL element, that is, an organic light-emitting diode (OLED), an inorganic light-emitting diode, a quantum dot light-emitting diode (QLED), and the like.

DESCRIPTION OF REFERENCE CHARACTERS

10: ORGANIC EL DISPLAY DEVICE
11: DISPLAY PORTION
15: PIXEL CIRCUIT
Pix(j,i): PIXEL CIRCUIT (i=1 TO n, j=1 TO m)
20: DISPLAY CONTROL CIRCUIT
30: DATA-SIDE DRIVE CIRCUIT (DATA SIGNAL LINE DRIVE CIRCUIT)
40: SCANNING-SIDE DRIVE CIRCUIT (SCANNING SIGNAL LINE DRIVE/EMISSION CONTROL CIRCUIT)
Gi: SCANNING SIGNAL LINE (i=1 TO n)
Dj: DATA SIGNAL LINE (j=1 TO m)
GPi: FIRST SCANNING SIGNAL LINE (i=1 TO n)
GNi: SECOND SCANNING SIGNAL LINE (i=1 TO n)
Ei: EMISSION CONTROL LINE (i=1 TO n)
EAi: FIRST EMISSION SIGNAL LINE (i=1 TO n)
EBi: SECOND EMISSION SIGNAL LINE (i=1 TO n)

Vini: INITIALIZATION VOLTAGE LINE, INITIALIZATION VOLTAGE

VElow: LOW-LEVEL VOLTAGE OF EMISSION CONTROL LINE

VEhigh: HIGH-LEVEL VOLTAGE OF EMISSION CONTROL LINE

ELVDD: HIGH-LEVEL POWER LINE (FIRST POWER LINE), HIGH-LEVEL POWER SUPPLY VOLTAGE

ELVSS: LOW-LEVEL POWER LINE (SECOND POWER LINE), LOW-LEVEL POWER SUPPLY VOLTAGE

OL: ORGANIC EL ELEMENT (DISPLAY ELEMENT)

Cst: HOLDING CAPACITOR

M1: DRIVE TRANSISTOR

M2: WRITE CONTROL TRANSISTOR

M3: THRESHOLD COMPENSATION TRANSISTOR

M4: CONTROL VOLTAGE INITIALIZATION TRANSISTOR (CONTROL VOLTAGE INITIALIZATION SWITCHING ELEMENT)

M5: FIRST EMISSION CONTROL TRANSISTOR

M6: SECOND EMISSION CONTROL TRANSISTOR

M7: OLED INITIALIZATION TRANSISTOR (DISPLAY ELEMENT INITIALIZATION SWITCHING ELEMENT)

Vg: GATE VOLTAGE

Va: ANODE VOLTAGE

TD: DRIVE PERIOD

TP: PAUSE PERIOD

Trf: REFRESH FRAME PERIOD (RF FRAME PERIOD)

Tnrf: NON-REFRESH FRAME PERIOD (NRF FRAME PERIOD)

TEoff: NON-EMISSION PERIOD

TLoff: LIGHTS-OFF PERIOD

The invention claimed is:

1. A display device including a display portion that includes a plurality of data signal lines, a plurality of scanning signal lines intersecting the plurality of data signal lines, and a plurality of emission control lines disposed along the plurality of scanning signal lines, in such a manner that the pixel circuit corresponds to any one of the plurality of data signal lines, corresponds to any one of the plurality of scanning signal lines, and corresponds to any one of the plurality of emission control lines, the display device comprising:

a plurality of pixel circuits disposed on the display portion along the plurality of data signal lines and the plurality of scanning signal lines so as to correspond to one of the plurality of data signal lines, each correspond to one of the plurality of scanning signal lines, and each correspond to one of the plurality of emission control lines;

a data-side drive circuit configured to generate a plurality of dates signals indicating data voltages to be written to the plurality of pixel circuits and configured to apply the data signals to the plurality of data signal lines;

a scanning-side drive circuit configured to selectively drive the plurality of scanning signal lines and selectively deactivate the plurality of emission control lines; and a display control circuit configured to control the data-side drive circuit and the scanning-side drive circuit such that a drive period and a pause period appear alternately, the drive period including a refresh frame period during which data voltages are written to the plurality of pixel circuits by selective driving of the plurality of scanning signal lines, the pause period including a non-refresh frame period during which writing of data voltages to the plurality of pixel circuits is stopped with the plurality of scanning signal lines in an unselected state; wherein each of the plurality of pixel circuits includes:

a display element driven by a current;

a holding capacitor;

a drive transistor configured to control a current flowing through the display element in accordance with a data voltage held in the holding capacitor;

a write control switching element having a control terminal connected to a corresponding scanning signal line;

at least one emission control switching element that has a control terminal connected to a corresponding emission control line and is connected in series with the display element; and an initialization circuit configured to initialize the display element;

the initialization circuit includes a display element initialization switching element and is configured such that when a voltage of the corresponding emission control line is at a level for turning off the emission control switching element, an initialization voltage for initializing the display element is applied to the display element via the display element initialization switching element based on the voltage of the corresponding emission control line; and the display control circuit is configured to:

control the data-side drive circuit and the scanning-side drive circuit such that during the drive period, the data-side drive circuit generates the plurality of data signals and applies the generated data signals to the plurality of data signal lines, and the scanning-side drive circuit selectively drives the plurality of scanning signal lines and selectively deactivates the plurality of emission control lines; and control the data-side drive circuit and the scanning-side drive circuit such that during the pause period, the data-side drive circuit stops the application of the plurality of data signals to the plurality of data signal lines, and the scanning-side drive circuit stops the driving of each of the plurality of scanning signal lines and selectively deactivates the plurality of emission control lines.

2. The display device according to claim 1, wherein the holding capacitor is connected to a corresponding data signal line via the write control switching element.

3. The display device according to claim 1, wherein the display portion further includes a first power line, a second power line, and an initialization voltage line configured to supply the initialization voltage, the emission control switching element is a transistor of a first conductivity type, the display element initialization switching element is a transistor of a second conductivity type different in conductivity type from the emission control switching element, a first electrode of the display element is connected to the first power line via the emission control switching element, and a second electrode of the display element is connected to the second power line, a control terminal of the display element initialization switching element is connected to the corresponding emission control line, and the initialization voltage line is connected to the first electrode of the display element via the display element initialization switching element.

4. The display device according to claim 3, wherein each of the plurality of pixel circuits further includes:

a threshold compensation switching element;

a control voltage initialization switching element; and first and second emission control switching elements each as the emission control switching element, wherein the drive transistor includes a first conductive terminal that is connected to a corresponding data signal line via the write control switching element and is connected to the first power line via the first emission control switching element, a second conductive terminal that is connected to the first electrode of the display element via the second emission control switching element, and a control terminal that is connected to the second conductive terminal via the threshold compensation switching element, is connected to the first power line via the holding capacitor, and is connected to the initialization voltage line via the control voltage initialization switching element, a control terminal of the control voltage initialization switching element is connected to a scanning signal line selected before the corresponding scanning signal line, control terminals of the first and second emission control switching elements and the display element initialization switching element are connected to the corresponding emission control line, the drive transistor, the write control switching element, and the first and second emission control switching elements are P-channel transistors, and the threshold compensation switching element, the control voltage initialization switching element, and the display element initialization switching element are N-channel transistors that each have a channel layer formed of an oxide semiconductor.

5. The display device according to claim 1, wherein the display portion further includes a plurality of inverting emission control lines that respectively correspond to the plurality of emission control lines and each transmit a logically inverted signal of a signal of a corresponding emission control line, the emission control switching element and the display element initialization switching element are transistors of the same conductivity type, and a control terminal of the display element initialization switching element is connected to an inverting emission control line corresponding to the corresponding emission control line.

6. The display device according to claim 5, wherein the emission control switching element and the display element initialization switching element are P-channel transistors.

7. The display device according to claim 4, wherein each of the P-channel transistors has a channel layer formed of low-temperature polysilicon.

8. The display device according to claim 1, wherein the display portion further includes:

a first power line configured to supply a high-voltage side power supply voltage, a second power line configured to supply a low-voltage side power supply voltage, and a low-voltage-side voltage line configured to supply a predetermined low-voltage-side voltage corresponding to the initialization voltage, the emission control switching element and the display element initialization switching element are N-channel transistors, a first electrode of the display element is connected to the first power line via the emission control switching element and is connected to the corresponding emission control line via the display element initialization switching element, and a second electrode of the display element is connected to the second power line, a control terminal of the display element initialization switching element is connected to the low-voltage-side voltage line, and the low-voltage-side voltage is higher than a voltage of the corresponding emission control line at a level for turning off the emission control switching element such that the display element initialization switching element is in an on-state when the voltage of the corresponding emission control line is at the level.

9. The display device according to claim 8, wherein each of the plurality of pixel circuits includes:

a threshold compensation switching element;

a control voltage initialization switching element; and first and second emission control switching elements each as the emission control switching element;

the drive transistor, the write control switching element, the first and second emission control switching elements, the threshold compensation switching element, and the control voltage initialization switching element are N-channel transistors, a control terminal of the control voltage initialization switching element is connected to a scanning signal line selected before the corresponding scanning signal line, control terminals of the first and second emission control switching elements are connected to the corresponding emission control line, and the drive transistor includes:

a first conductive terminal that is connected to the first power line via the first emission control switching element, a second conductive terminal that is connected to a corresponding data signal line via the write control switching element and is connected to the first electrode of the display element via the second emission control switching element, and a control terminal that is connected to the first conductive terminal via the threshold compensation switching element, is connected to the first electrode of the display element via the holding capacitor, and is connected to the first power line via the control voltage initialization switching element.

10. The display device according to claim 8, wherein in each of the N-channel transistors has a channel layer formed of an oxide semiconductor.

11. A pixel circuit provided in a display device including a display portion that includes a plurality of data signal lines, a plurality of scanning signal lines intersecting the plurality of data signal lines, and a plurality of emission control lines disposed along the plurality of scanning signal lines, in such a manner that the pixel circuit corresponds to any one of the plurality of data signal lines, corresponds to any one of the plurality of scanning signal lines, and corresponds to any one of the plurality of emission control lines, the pixel circuit comprising:

a display element driven by a current;

a holding capacitor;

a drive transistor configured to control a current flowing through the display element in accordance with a data voltage held in the holding capacitor;

a write control switching element having a control terminal connected to a corresponding scanning signal line;

a threshold compensation switching element;

a control voltage initialization switching element;

first and second emission control switching elements that each have a control terminal connected to a corresponding emission control line and that are each connected in series with the display element; and an initialization circuit configured to initialize the display element, wherein the initialization circuit includes a display element initialization switching element and is configured such that when a voltage of the corresponding emission control line is at a level for turning off the emission control switching element, an initialization voltage for initializing the display element is applied to the display element via the display element initialization switching element based on the voltage of the corresponding emission control line, the display portion further includes a first power line, a second power line, and an initialization voltage line configured to supply the initialization voltage, a first electrode of the display element is connected to the first power line via the first and second emission control switching elements, and a second electrode of the display element is connected to the second power line, a control terminal of the display element initialization switching element is connected to the corresponding emission control line, the initialization voltage line is connected to the first electrode of the display element via the display element initialization switching element, the drive transistor includes:

a first conductive terminal that is connected to a corresponding data signal line via the write control switching element and is connected to the first power line via the first emission control switching element, a second conductive terminal that is connected to the first electrode of the display element via the second emission control switching element, and a control terminal that is connected to the second conductive terminal via the threshold compensation switching element, is connected to the first power line via the holding capacitor, and is connected to the initialization voltage line via the control voltage initialization switching element, a control terminal of the control voltage initialization switching element is connected to a scanning signal line selected before the corresponding scanning signal line, control terminals of the first and second emission control switching elements and the display element initialization switching element are connected to the corresponding emission control line, the drive transistor, the write control switching element, and the first and second emission control switching elements are P-channel transistors, and the threshold compensation switching element, the control voltage initialization switching element, and the display element initialization switching element are N-channel transistors that each have a channel layer formed of an oxide semiconductor.

12. The pixel circuit according to claim 11, wherein each of the P-channel transistors has a channel layer formed of low-temperature polysilicon.

13. A pixel circuit provided in a display device including a display portion that includes a plurality of data signal lines, a plurality of scanning signal lines intersecting the plurality of data signal lines, and a plurality of emission control lines disposed along the plurality of scanning signal lines, in such a manner that the pixel circuit corresponds to any one of the plurality of data signal lines, corresponds to any one of the plurality of scanning signal lines, and corresponds to any one of the plurality of emission control lines, the pixel circuit comprising:

a display element driven by a current;

a holding capacitor;

a drive transistor configured to control a current flowing through the display element in accordance with a data voltage held in the holding capacitor;

a write control switching element having a control terminal connected to a corresponding scanning signal line;

at least one emission control switching element that has a control terminal connected to a corresponding emission control line and is connected in series with the display element; and an initialization circuit configured to initialize the display element, wherein the initialization circuit includes a display element initialization switching element and is configured such that when a voltage of the corresponding emission control line is at a level for turning off the emission control switching element, an initialization voltage for initializing the display element is applied to the display element via the display element initialization switching element based on the voltage of the corresponding emission control line, the display portion further includes:

a first power line configured to supply a high-voltage side power supply voltage, a second power line configured to supply a low-voltage side power supply voltage, and a low-voltage-side voltage line configured to supply a predetermined low-voltage-side voltage corresponding to the initialization voltage, the emission control switching element and the display element initialization switching element are N-channel transistors, a first electrode of the display element is connected to the first power line via the emission control switching element and is connected to the corresponding emission control line via the display element initialization switching element, and a second electrode of the display element is connected to the second power line, a control terminal of the display element initialization switching element is connected to the low-voltage-side voltage line, and the low-voltage-side voltage is higher than a voltage of the corresponding emission control line at a level for turning off the emission control switching element such that the display element initialization switching element is in an on-state when the voltage of the corresponding emission control line is at the level.

14. The pixel circuit according to claim 13, wherein the holding capacitor is connected to a corresponding data signal line via the write control switching element.

15. The pixel circuit according to claim 13, further comprising:

a threshold compensation switching element;

a control voltage initialization switching element; and first and second emission control switching elements each as the emission control switching element, wherein the drive transistor, the write control switching element, the first and second emission control switching elements, the threshold compensation switching element, and the control voltage initialization switching element are N-channel transistors, a control terminal of the control voltage initialization switching element is connected to a scanning signal line selected before the corresponding scanning signal line, control terminals of the first and second emission control switching elements are connected to the corresponding emission control line, and the drive transistor includes:

a first conductive terminal that is connected to the first power line via the first emission control switching element, a second conductive terminal that is connected to a corresponding data signal line via the write control switching element and is connected to the first electrode of the display element via the second emission control switching element, and a control terminal that is connected to the first conductive terminal via the threshold compensation switching element, is connected to the first electrode of the display element via the holding capacitor, and is connected to the first power line via the control voltage initialization switching element.

16. The pixel circuit according to claim 13, wherein each of the N-channel transistors has a channel layer formed of an oxide semiconductor.

* * * * *